United States Patent
Suzuki et al.

(10) Patent No.: US 7,476,706 B2
(45) Date of Patent: Jan. 13, 2009

(54) METHOD FOR PRODUCING POLYORGANOSILOXANE PARTICLES AND FOR PRODUCING SILICA PARTICLES

(75) Inventors: Taro Suzuki, Gifu (JP); Junji Kawashima, Gifu (JP); Tatsuya Nakano, Gifu (JP)

(73) Assignee: Ube Nitto Kasei Co., Ltd., Tokyo (JP)

( * ) Notice: Subject to any disclaimer, the term of this patent is extended or adjusted under 35 U.S.C. 154(b) by 251 days.

(21) Appl. No.: 10/538,755

(22) PCT Filed: Feb. 24, 2004

(86) PCT No.: PCT/JP2004/002130

§ 371 (c)(1),
(2), (4) Date: Jul. 20, 2005

(87) PCT Pub. No.: WO2004/076533

PCT Pub. Date: Sep. 10, 2004

(65) Prior Publication Data

US 2005/0261380 A1  Nov. 24, 2005

(30) Foreign Application Priority Data

| Feb. 27, 2003 | (JP) | 2003-050417 |
| Mar. 13, 2003 | (JP) | 2003-067777 |
| May 14, 2003 | (JP) | 2003-135245 |

(51) Int. Cl.
  *C08G 77/06* (2006.01)
  *C08L 83/12* (2006.01)
(52) U.S. Cl. ............ 524/837; 524/859; 528/12
(58) Field of Classification Search ......... 516/77; 528/21
See application file for complete search history.

(56) References Cited

U.S. PATENT DOCUMENTS

| 3,354,095 A | 11/1967 | Burzynski et al. |
| 5,750,258 A * | 5/1998 | Sakai et al. ............ 428/405 |

(Continued)

FOREIGN PATENT DOCUMENTS

JP   04-088023   3/1992

(Continued)

OTHER PUBLICATIONS

International Search Report for PCT/JP2004/002130 dated Jun. 8, 2004.

*Primary Examiner*—Randy Gulakowski
*Assistant Examiner*—Robert Loewe
(74) *Attorney, Agent, or Firm*—Nixon & Vanderhye P.C.

(57) ABSTRACT

The present invention provides a method for producing polyorganosiloxane particles through the step of hydrolyzing and condensing a silicon compound having a non-hydrolyzable group and a hydrolyzable alkoxyl group bonded to its silicon atom in the presence of a catalyst and thereby forming seed particles of polyorganosiloxane particles to obtain a seed-particles-containing solution and the step of adding a particle-diameter-growing aqueous solution containing the same silicon compound or a hydrolyzate thereof to the above seed-particles-containing solution to grow the above seed particles, the method comprising the step of obtaining the seed-particles-containing solution, in which particles are measured for a particle diameter continuously or at intervals of a constant time period and terminating the reaction at a time when an intended particle diameter is reached.

11 Claims, 2 Drawing Sheets

U.S. PATENT DOCUMENTS

| | | |
|---|---|---|
| 6,214,927 B1 | 4/2001 | Craig et al. |
| 6,359,667 B1 | 3/2002 | Koyanagi et al. |
| 6,680,040 B1 * | 1/2004 | Nishida et al. ............. 423/335 |
| 2003/0008155 A1 * | 1/2003 | Hayashi et al. ............. 428/447 |

FOREIGN PATENT DOCUMENTS

| | | |
|---|---|---|
| JP | 04-240112 | 8/1992 |
| JP | 4-70335 | 11/1992 |
| JP | 06-087608 | 3/1994 |
| JP | 06-192426 | 7/1994 |
| JP | 11-092560 | 4/1999 |
| JP | 11-116680 | 4/1999 |
| JP | 11-152336 | 6/1999 |
| JP | 11-286551 | 10/1999 |
| JP | 2000-017074 | 1/2000 |
| JP | 2000-080598 | 3/2000 |
| JP | 2000-204168 | 7/2000 |
| JP | 2001-302227 | 10/2001 |
| JP | 2002-038049 | 2/2002 |
| JP | 2002-047348 | 2/2002 |
| JP | 2002-080598 | 3/2002 |
| JP | 2002-80598 A * | 3/2002 |
| JP | 2003-171466 | 6/2003 |

* cited by examiner

METHOD FOR PRODUCING POLYORGANOSILOXANE PARTICLES AND FOR PRODUCING SILICA PARTICLES

This application is the US national phase of international application PCT/JP2004/002130 filed 24 Feb. 2004, which designated the U.S. and claims benefit of JP 2003-050417, filed 27 Feb. 2003; JP 2003-067777 filed 13 Mar. 2003; and JP 2003-1 35245 filed 14 May 2003, the entire contents of each of which are hereby incorporated by reference.

1. Technical Field

The present invention relates to a method for producing polyorganosiloxane particles and a method for producing silica particles.

2. Technical Background

Conventionally, silica particles having a particle diameter distribution in a monodisperse state (to be sometimes referred to as "monodisperse silica" hereinafter) are known to be useful as various fillers, ceramic material, or the like. Particularly, use thereof as a spacer for a liquid crystal display attracts attention, and their use has recently begun.

It is conventional practice to use glass fiber chips or fine particles of a synthetic resin as a spacer for a liquid crystal display. However, although glass fiber chips are excellent in fiber diameter accuracy, the length thereof varies to a great extent, and chips having too large lengths may be visually observable to deteriorate an image quality. Further, since they have sharp ends, they may damage an orientation film or protective film formed on a substrate or a color filter or electric elements. Further, fine particles of a synthetic resin are poor in particle diameter accuracy, so that they are sometimes incapable of satisfying performances that they are required to have as a spacer for a liquid crystal display. When higher gap accuracy is required, therefore, there are required particles that are excellent in particle diameter accuracy and are spherical and that can preclude the possibility of damaging an orientation film and protective film formed on a substrate or a color filter or electric elements such as an ITO electrically conductive film, or the like.

For satisfying the above requirements, there have been proposed silica particles obtained by hydrolysis and polycondensation of a silicon alkoxide. The silica particles have the following advantages:

(1) They have a high purity, and there is little or no influence that is caused on a liquid crystal by an elution component.

(2) They are excellent in particle diameter accuracy, and the CV value (coefficient of variation) represented by the following expression can be controlled into 10% or less.

$CV (\%) = $ [standard deviation (μm) of fine particle diameter]/[average particle diameter (μm)]×100

(3) They can be formed as almost complete spheres, so that they can preclude the possibility of damaging an orientation film and protective film formed on a substrate or a color filter or electric elements such as an ITO electrically conductive film, or the like.

Further, as a spacer, there are also recently used polyorganosiloxane (polymethylsilsesquioxane) particles that are obtained by hydrolysis and condensation of a silicon alkoxide having a non-hydrolyzable alkyl group (methyl), such as alkyltrialkoxysilane (methyltrialkoxysilane), and that are imparted with softness to some extent so that the particles are improved in fixing and bonding properties in a liquid crystal cell.

As a method for producing such polymethylsilsesquioxane particles, there has been proposed a method in which methyltrialkoxysilane or a partial hydrolysis condensate thereof and an aqueous solution containing ammonia or an amine or a solvent solution mixture of water with an organic solvent are reacted while a two-layer state is maintained substantially without mixing them (see JP-B-4-70335).

In the above method, however, the particle diameter of the polymethylsilsesquioxane particles to be formed is controlled on the basis of the concentration of the ammonia or amine of a lower layer when they are charged, and the formation of core particles is indefinite, so that the number of formed particle cores is liable to vary. Even when the reaction is carried out under the same conditions, the diameter of finally obtained particles deviates from an intended particle diameter. For example, when the production is carried out 10 times under the same conditions for obtaining particles having an average particle diameter of 5 μm, the particle diameter varies by about 40% (approximately ±2.0 μm) of the intended particle diameter.

On the other hand, there has been proposed a method for producing polyorganosiloxane particles, in which particles having a monodisperse particle diameter distribution and having a desired particle diameter can be obtained (see JP-A-2000-80598).

The above method is a method in which methyltrialkoxysilane is caused to undergo hydrolysis and condensation to form seed particles of polyorganosiloxane particles and then the seed particles are grown to produce polyorganosiloxane particles having larger particle diameters, and the method has a characteristic feature in that the dilution ratio for a seed particle solution, which is to be determined depending upon an intended final particle diameter, is derived from the average particle diameter of the seed particles, the concentration of a particles-growing solution, and the like, on the basis of a specific calculation formula and that the seed particle solution is diluted at such a dilution ratio and added to the particles-growing solution, thereby to produce polyorganosiloxane particles having an intended particle diameter.

In the above method, however, it is required to calculate the dilution ratio for every batch and carry out a dilution operation therefor. Further, it is difficult to produce polyorganosiloxane particles having a large particle diameter of over 10 μm, which have come to be demanded due to a recent change in the specification of liquid crystal displays. Furthermore, although polyorganosiloxane particles having a particle diameter of approximately 4 to 10 μm and having a monodisperse particle diameter distribution can be obtained, the particle diameters are controlled in the order of μm, and when it is attempted to make the particle diameters uniform up to a nm order level, it is difficult to control the particle diameters.

As described above, almost nothing has been reported about a method of producing polyorganosiloxane particles in which particles obtained have a large particle diameter and the particle diameter distribution thereof is monodisperse, or a method of producing polyorganosiloxane particles having large particle diameters in which the particle diameters thereof are made uniform up to a nm order level.

Alternatively, there is disclosed a method of producing spherical silica particles, in which a polymethylsilsesquioxane powder is calcined at a temperature at which the organic group (methyl) of its molecule is decomposed (500-1,300° C.) (see JP-B-5-13089). However, this method involves a problem that when polymethylsiloxane particles are calcined to form silica, the particles are greatly decreased in diameter, so that it is difficult to attain the final particle diameter of the intended silica particles with good accuracy. The silica particles obtained by this method are therefore not suitable for use as a spacer for a liquid crystal display, or the like, which requires particularly high particle diameter accuracy [low CV value, low particle diameter difference (particle diameter of particles as an end product—particle diameter of obtained particles)]. Further, there is another problem that the organic group is sharply decomposed or eliminated during the calcining, which results in a case where the disruptive strength of the particles decreases or the particles are broken.

DISCLOSURE OF THE INVENTION

Under the circumstances, it is a first object of the present invention to provide a method for producing polyorganosiloxane particles satisfying a particle diameter range (approximately 1 to 30 µm) suitable as a spacer for a liquid crystal display or as standard particles and having a particle diameter distribution that is monodisperse, at good yields by simple procedures for a short period of time.

Further, it is a second object of the present invention to provide an industrially advantageous method for calcining polyorganosiloxane particles to produce silica particles having high particle diameter accuracy [low CV value, low particle diameter difference (particle diameter of particles as an end product—particle diameter of obtained particles)] by simple procedures for a short period of time.

For achieving the above objects, the present inventors have made diligent studies and as a result have found the following. When polyorganosiloxane particles are produced through the step of hydrolyzing and condensing a silicon compound having a silicon atom to which a non-hydrolyzable group and a hydrolyzable alkoxyl group are boned, in the presence of a catalyst, to form seed particles of polyorganosiloxane particles and thereby obtaining a seed-particles-containing solution and the step of adding a particle-growing aqueous solution containing the same silicon compound or a hydrolyzate thereof to the above seed-particles-containing solution to grow the above seed particles, (i) in the above step of obtaining the seed-particles-containing solution, when the silicon compound is dissolved in an aqueous medium, 0.7 to 6.5 mass ppm of a basic catalyst is added to the above aqueous medium to cause the silicon compound to undergo preliminary hydrolysis and condensation, and a basic catalyst is added thereto in an amount necessary for forming the seed particles formed of polyorganosiloxane, to form the above seed particles, or (ii) in the above step of growing the seed particles, the seed particles are measured for diameters continuously or at intervals of a constant time period and the reaction is terminated when an intended particle diameter is reached, or (iii) in the above step of growing the seed particles, an anionic surfactant is allowed to be present in the particle-diameter growing aqueous solution such that the concentration thereof in the particle-diameter growing aqueous solution satisfies a specific relational expression, whereby the first object can be achieved.

Further, the present inventors have found that when polyorganosiloxane particles are heat-treated to produce silica particles, preliminary calcining of the polyorganosiloxane particles is carried out at a specific temperature and then regular calcining thereof is carried out at a temperature equivalent to, or higher than, the temperature at which the organic group of the polyorganosiloxane is decomposed, whereby the decrease in the disruptive strength of the particles and the breaking of particles, observed during the heat treatment, are solved, so that the second object can be achieved.

That is, according to the present invention, there are provided;

(1) a method for producing polyorganosiloxane particles, which comprises the step (A) of hydrolyzing and condensing a silicon compound of the general formula (I), $$R^1{}_n Si(OR^2)_{4-n} \quad (I)$$

wherein $R^1$, which is a non-hydrolyzable group, is an alkyl group having 1 to 20 carbon atoms, an alkyl group having 1 to 20 carbon atoms and having a (meth)acryloyloxy group or epoxy group, an alkenyl group having 2 to 20 carbon atoms, an aryl group having 6 to 20 carbon atoms or an aralkyl group having 7 to 20 carbon atoms, $R^2$ is an alkyl group having 1 to 6 carbon atoms and n is an integer of 1 to 3, provided that when a plurality of $R^1$s are present, each of $R^1$s may be identical to, or different from, other or every other one, and that when a plurality of $OR^2$ are present, each of $OR^2$s may be identical to, or different from, other or every other one, in the presence of a catalyst, to form seed particles of polyorganosiloxane particles and thereby obtaining a seed-particles-containing solution, and the step (B) of mixing said seed-particles-containing solution with a particle-diameter-growing aqueous solution containing a silicon compound of said general formula (I) or a hydrolyzate thereof, to grow said seed particles, the method comprising the step (A) of obtaining the seed-particles-containing solution in which, when said silicon compound is dissolved in an aqueous medium, 0.7 to 6.5 mass ppm of a basic catalyst is added to said aqueous medium to cause the silicon compound to undergo preliminary hydrolysis and condensation, and a basic catalyst is added thereto in an amount necessary for forming the seed particles formed of polyorganosiloxane, to form said seed particles, (2) the method as recited in the above (1), wherein the basic catalyst is ammonia, (3) the method as recited in the above (1) or (2), wherein the silicon compound of the general formula (I) is methyltrimethoxysilane or vinyltrimethoxysilane, (4) the method as recited in any one of the above (1) to (3), wherein the polyorganosiloxane particles produced have an average particle diameter of over 10 µm and have a particle size distribution whose coefficient of variation (CV value) is 5% or less, (5) a method for producing polyorganosiloxane particles, which comprises the step (A) of hydrolyzing and condensing a silicon compound of the general formula (I), $$R^1{}_n Si(OR^2)_{4-n} \quad (I)$$

wherein $R^1$, which is a non-hydrolyzable group, is an alkyl group having 1 to 20 carbon atoms, an alkyl group having 1 to 20 carbon atoms and having a (meth)acryloyloxy group or epoxy group, an alkenyl group having 2 to 20 carbon atoms, an aryl group having 6 to 20 carbon atoms or an aralkyl group having 7 to 20 carbon atoms, $R^2$ is an alkyl group having 1 to 6 carbon atoms and n is an integer of 1 to 3, provided that when a plurality of $R^1$s are present, each of $R^1$s may be identical to, or different from, other or every other one, and that when a plurality of $OR^2$ are present, each of $OR^2$s may be identical to, or different from, other or every other one, in the presence of a catalyst, to form seed particles of polyorganosiloxane particles and thereby obtaining a seed-particles-containing solution, and the step (B) of mixing said seed-particles-containing solution with a particle-diameter-growing aqueous solution containing a silicon compound of said general formula (I) or a hydrolyzate thereof, to grow said seed particles, the method comprising the step (B) of growing the seed particles, in which the seed particles are measured for diameters continuously or at intervals of a constant time period and the reaction is terminated when an intended particle diameter is reached, (6) the method as recited in the above (5), wherein the seed particles are measured for diameters continuously or at intervals of a constant time period in a manner in which part of a reaction solution is sampled and brought into contact with a protective-colloid-forming agent to form a protective colloid on the particles in the reaction solution, and then the measurement is made by a Coalter method, (7) The method as recited in the above (5) or (6), wherein the polyorganosiloxane particles are polymethylsilsesquioxane particles, (8) the method as recited in any one of the above (5) to (7), wherein the particle-diameter-growing aqueous solution containing the silicon compound or a hydrolyzate thereof is added at a rate of 0.01 ml/minute or less per milliliter of volume of the seed-particles-containing solution, for obtaining the polyorganosiloxane particles having a diameter of over 10 μm, (9) the method as recited in any one of the above (5) to (8), wherein the polyorganosiloxane particles finally obtained have a particle diameter of 1 to 30 μm and a coefficient of variation of 3% or less,

(10) a method for producing polyorganosiloxane particles, which comprises the step (A) of hydrolyzing and condensing a silicon compound of the general formula (I), $$R^1_n Si(OR^2)_{4-n} \qquad (I)$$

wherein $R^1$, which is a non-hydrolyzable group, is an alkyl group having 1 to 20 carbon atoms, an alkyl group having 1 to 20 carbon atoms and having a (meth)acryloyloxy group or epoxy group, an alkenyl group having 2 to 20 carbon atoms, an aryl group having 6 to 20 carbon atoms or an aralkyl group having 7 to 20 carbon atoms, $R^2$ is an alkyl group having 1 to 6 carbon atoms and n is an integer of 1 to 3, provided that when a plurality of $R^1$s are present, each of $R^1$s may be identical to, or different from, other or every other one, and that when a plurality of $OR^2$ are present, each of $OR^2$s may be identical to, or different from, other or every other one, in the presence of a catalyst, to form seed particles of polyorganosiloxane particles and thereby obtaining a seed-particles-containing solution, and the step (B) of mixing said seed-particles-containing solution with a particle-diameter-growing aqueous solution containing a silicon compound of said general formula (I) or a hydrolyzate thereof, to grow said seed particles, the method comprising the step (B) of growing the seed particles, in which an anionic surfactant is added to the seed-particles-containing solution to grow the seed particles, the anionic surfactant having a concentration that satisfies the relational expression (II), $$Y=\alpha \times (a \times X)/(A \times R) \qquad (II)$$

wherein a is a theoretical value obtained by dividing a molecular weight of a product that is a hydrolysis and condensation product of the silicon compound with a molecular weight of the silicon compound, Y is a concentration (mass %) of the anionic surfactant in the particle-diameter-growing aqueous solution, X is a mass (g) of the raw material to be used for synthesis of the seed particles, A is a total mass (g) of the solutions for use in the step (B) of growing seed particles, R is an average particle diameter (μm) of the seed particles, and α is a coefficient in the range of $4.0 < \alpha \leq 75$,

(11) the method as recited in the above (10), wherein the anionic surfactant has an HLB value of 15 to 40,

(12) the method as recited in the above (11), wherein the anionic surfactant is a higher alcohol sulfuric ester salt,

(13) the method as recited in the above (12), wherein the higher alcohol sulfuric ester salt is sodium dodecyl sulfate,

(14) the method as recited in any one of the above (10) to (13), wherein, in the step (A) of forming seed particles, a separately prepared solution containing polyorganosiloxane particles is added to a reaction system containing the silicon compound, and the silicon compound is caused to undergo hydrolysis and condensation in the presence of the polyorganosiloxane particles, to form the seed particles,

(15) the method as recited in any one of the above (10) to (14), wherein the polyorganosiloxane particles have an average particle diameter of over 10 μm, and

(16) a method for producing silica particles, which comprises preliminarily calcining the polyorganosiloxane particles obtained by the method recited in any one of the above (1) to (15) at a temperature that is higher than the temperature which is lower than a decomposition temperature of the organic group contained therein by 150° C. and that is less than the decomposition temperature of the organic group, and then calcining the polyorganosiloxane particles at the decomposition temperature of the organic group or higher.

According to the method for producing polyorganosiloxane particles, provided by the present invention, polyorganosiloxane particles satisfying a relatively large particle diameter range (approximately 1 to 30 μm) and having a monodisperse particle diameter distribution can be produced at good yields for a short period of time by simple procedures without requiring the procedure of diluting the seed-particles-growing solution, and the like, so that particles having desired diameters can be obtained each time. Polyorganosiloxane particles obtained by the above method are suitable as a spacer for a liquid crystal display or as standard particles.

According to the method for producing silica particles, provided by the present invention, the polyorganosiloxane particles obtained by the above method are calcined under the specified conditions, whereby there can be produced silica particles having a particle diameter suitable as a spacer for a liquid crystal display or as standard particles and having a particle diameter distribution that is highly monodisperse.

PREFERRED EMBODIMENTS OF THE INVENTION

Figure 1:
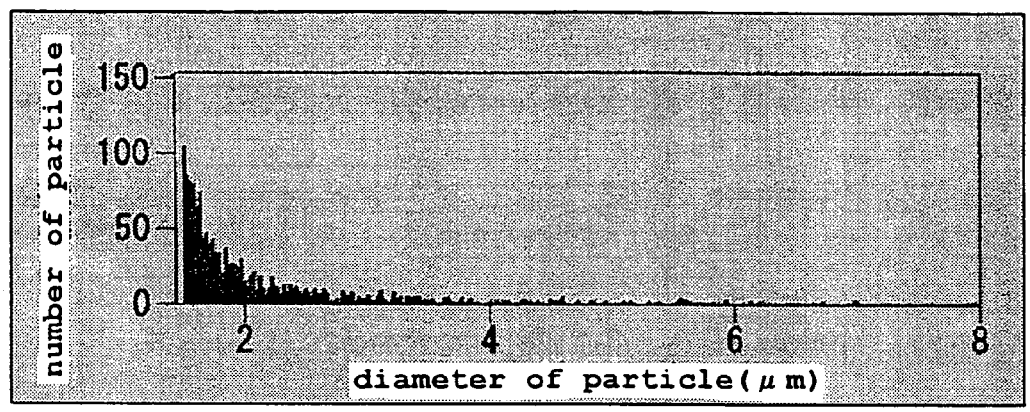
FIG. 1 is a particle diameter distribution chart obtained by measuring fine particles in a seed-particles-growing solution in Example 1 for particle diameters with a Coalter counter.

The method for producing polyorganosiloxane according to the present invention includes a first embodiment described in claim 1, a second embodiment described in claim 5 and a third embodiment described in claim 10. These three embodiments have in common constitutional requirements of the step (A) of preparing a seed-particles-containing solution and the step (B) of growing seed particles. In addition to the above constitutional requirements, the first embodiment of the present invention has a constitutional requirement that, in the step (A) of preparing a seed-particles-containing solution, 0.7 to 6.5 mass ppm of a basic catalyst is added to an aqueous medium when the silicon compound is dissolved in the aqueous medium, the silicon compound is caused to undergo preliminary hydrolysis and condensation, and then a basic catalyst is added thereto in an amount necessary for forming seed particles of polyorganosiloxane to grow the seed particles. Further, the second embodiment of the present invention has a constitutional requirement that, in the step (B) of growing seed particles, the seed particles are measured for particle diameters continuously or at intervals of a constant time period, and an intended particle diameter is reached, the reaction is terminated. Further, the third embodiment of the present invention has a constitutional requirement that, in the step (B) of growing seed particles, a particle-diameter-growing aqueous solution containing an anionic surfactant having a concentration that satisfies the specified relational expression is added to the seed-particles-containing solution to grow the seed particles.

First, the steps (A) and (B) as constitutional requirements common to the first to third embodiments in the present invention will be explained, respectively.

Step (A)

In step (A), a silicon compound of the general formula (I)

$$R^1_n Si(OR^2)_{4-n} \qquad (I)$$

is used as a raw material.

In the above general formula (I), $R^1$ is an alkyl group having 1 to 20 carbon atoms, an alkyl group having 1 to 20 carbon atoms and having a (meth)acryloyloxy group or an epoxy group, an alkenyl group having 2 to 20 carbon atoms, an aryl group having 6 to 20 carbon atoms or an aralkyl group having 7 to 20 carbon atoms. As the above alkyl group having 1 to 20 carbon atoms, an alkyl group having 1 to 10 carbon atoms is preferred. The alkyl group may be linear, branched or cyclic. Examples of the alkyl group include methyl, ethyl, n-propyl, isopropyl, n-butyl, isobutyl, sec-butyl, tert-butyl, pentyl, hexyl, octyl, cyclopentyl and cyclohexyl. As the alkyl group having 1 to 20 carbon atoms and having a (meth)acryloyloxy group or an epoxy group, an alkyl group having 1 to 10 carbon atoms and having the above substituent is preferred. The alkyl group may be linear, branched or cyclic. Examples of the above alkyl group having the substituent include γ-acryloyloxypropyl, γ-methacryloyloxypropyl, γ-glycidoxypropyl and 3,4-epoxycyclohexyl. As the alkenyl group having 2 to 20 carbon atoms, an alkenyl group having 2 to 10 carbon atoms is preferred. The alkenyl group may be linear, branched or cyclic. Examples of the alkenyl group include vinyl, allyl, butenyl, hexenyl and octenyl. As the aryl group having 6 to 20 carbon atoms, an aryl group having 6 to 10 carbon atoms is preferred. Examples thereof include phenyl, tolyl, xylyl and naphthyl. As the aralkyl group having 7 to 20 carbon atoms, an aralkyl group having 7 to 10 carbon atoms is preferred. Examples thereof include benzyl, phenetyl, phenylpropyl and naphthylmethyl.

$R^2$ is an alkyl group having 1 to 6 carbon atoms, and the alkyl group may be linear, branched or cyclic. Examples thereof include methyl, ethyl, n-propyl, isopropyl, n-butyl, isobutyl, sec-butyl, pentyl, hexyl, cyclopentyl and cyclohexyl.

n is an integer of 1 to 3. When a plurality of $R^1$s is present, each of $R^1$s may be identical to, or different from, other or every other one. When a plurality of $OR^2$s are present, each of $OR^2$ may be identical to, or different from, other or every other one.

Examples of the above silicon compound of the general formula (I) include methyltrimethoxysilane, methyltriethoxysilane, methyltripropoxysilane, methyltriisopropoxysilane, ethyltrimethoxysilane, ethyltriethoxysilane, propyltriethoxysilane, butyltrimethoxysilane, phenyltrimethoxysilane, phenyltriethoxysilane, vinyltrimethoxysilane, vinyltriethoxysilane, γ-glycidoxypropyltrimethoxysilane, γ-acryloyloxypropyltrimethoxysilane, γ-methacryloyloxypropyltrimethoxysilane, dimethyldimethoxysilane, methylphenyldimethoxysilane, divinyldimethoxysilane, divinyldiethoxysilane, trivinylmethoxysilane and trivinylethoxysilane. Of these, silicon compounds having less content of an organic component are preferred in view of a little or less decrease in the diameter of polyorganosiloxane particles and the efficiency of forming silica by removing an organic component in the step of forming silica by heat treatment of polyorganosiloxane particles after the polyorganosiloxane particles are obtained. And, methyltrimethoxysilane and vinyltrimethoxysilane are preferred, and methyltrimethoxysilane is particularly preferred.

In the present invention, one silicon compound of the above general formula (I) may be used, or at least two silicon compounds of the above general formula (I) may be used in combination, as a raw material.

The step (A) includes the following procedures (1) and (2).
(1) Preparation of seed-particles-forming solution
(2) Formation of seed particles
The above procedures (1) and (2) will be explained in detail below.

(1) Preparation of Seed-particles-forming Solution

In the method for producing polyorganosiloxane particles, provided by the present invention, the formation of the seed particles and the growth of the particles in diameter are carried out in uniform systems, respectively, so that the compound to be used for the preparation of the seed-particles-forming solution can be selected from the compounds of the above general formula (I) as required regardless of their specific gravities. When the formation of seed particles and the growth of particles in diameter are carried out by a two layer method, it is required to use a silicon compound having a lower specific gravity than an aqueous medium, so that the raw material is inevitably limited in kind. In the present invention, however, there is no limitation to the specific gravity, so that the degree of freedom for the selection of the raw material is high.

The above silicon compound is not specially limited so long as it has miscibility with an aqueous medium, and it can be selected from the above-described silicon compounds. Above all, a silicon compound easily soluble in an aqueous medium, such as a silicon compound having a methoxy group, is preferred. When silica particles are to be obtained by calcining, methyltrimethoxysilane, which has a high silicon content, is the most preferred as described above.

The aqueous medium can be selected from water or a mixture of water with a water-miscible organic solvent. The water used here preferably has a less content of cation and preferably has an electric conductivity of $0.5 \times 10^{-4}$ S/cm or less. Examples of the water-miscible organic solvent include lower alcohols such as methanol, ethanol, propanol and butanol, ketones such as acetone, and the like. These may be singly mixed with water, or a combination of two members of these may be mixed with water.

In the above preparation of seed-particles-forming solution, the above silicon compound is added to the above aqueous medium and the mixture is stirred generally at a temperature of approximately 0 to 50° C. to form a homogeneous aqueous solution. In this case, the concentration of the silicon compound is preferably 20 mass % or less. When this concentration exceeds 20 mass %, the coefficient of variation of the particle diameter distribution increases, and when it is too small, the volume efficiency is poor, which are industrially disadvantageous. The above concentration is more preferably in the range of 5 to 15 mass %.

The stirring rate during the preparation of the seed-particles-forming solution cannot be uniformly determined since the stirring effect differs depending upon the size of a container for the preparation of the seed-particles-forming solution and the size of blade(s).

Further, the time period for dissolving the silicon compound is not specially limited, since it differs depending upon temperatures, etc., during the dissolving. However, when the dissolving time period is too large, the effect of the present invention is not fully exhibited.

The first embodiment of the present invention has a characteristic feature in the step (A) of preparing the seed-particles-containing solution. That is, the first embodiment employs an essential requirement that 0.7 to 6.5 mass ppm of a basic catalyst is added to the above aqueous medium for causing the silicon compound to undergo preliminary hydrolysis and condensation in the preparation of the above seed-particles-forming solution. In the procedure of forming the seed particles in (2) to be described later, therefore, there can be formed seed particles having a larger particle diameter than seed particles that are formed in any conventional method. As a result, the seed particles are grown, and there is thereby produced an effect that there can be efficiently produced polyorganosiloxane particles having an average particle diameter, for example, of over 10 μm and having a monodisperse particle diameter distribution.

When seed particles obtained have a large particle diameter, for example, of 10 μm or more, and when the particle diameter of polyorganosiloxane particles to be obtained is approximately equivalent thereto, it is construed that the step (A) of preparing the seed-particles-containing solution and the step (B) of growing the seed particles are carried out at the same time, and it is no longer necessary to carry out the procedure of growing the seed particles thereafter.

The above basic catalyst is the same as a catalyst to be used in the formation of seed particles of the following (2) in kind.

The reason for limiting the amount of the above basic catalyst to 0.7 to 6.5 mass ppm based on the aqueous medium used is that when it deviates from the above range, no particles having a large particle diameter can be obtained in the formation of seed particles, so that the effect of the present invention is not produced. Although differing depending upon kinds of the basic catalyst, kinds of the aqueous medium, kinds and concentrations of the silicon compound, temperatures for the preparation of the seed-particles-forming solution, and the like, preferably, the above amount is determined generally to be in the range of 1.0 to 5.0 mass ppm.

(2) Formation of Seed Particles

While the seed-particles-forming solution prepared in the above procedure (1) is stirred, a basic catalyst, preferably, an aqueous solution containing ammonia and/or an amine is added at once as a catalyst, the silicon compound is thereby caused to undergo hydrolysis and condensation, to form seed particles, and a seed-particles-containing solution is obtained.

When the aqueous solution containing ammonia and/or an amine is gradually added, the system comes to be uniform, and a large amount of core particles are newly formed and come to have a small diameter, so that it is preferred to add it at once.

When the aqueous solution containing ammonia and/or an amine is added, the stirring rate can be determined as required depending upon the size of a reaction vessel and the form and size of blade(s). Examples of the above amine preferably include monomethylamine, dimethylamine, monoethylamine, diethylamine and ethylenediamine. The above ammonia and the above amines may be used singly or in combination of at least two members of them. However, ammonia is preferred since it is less toxic, easy to remove and less expensive.

As an aqueous solution containing ammonia and/or an amine, there is employed a solution of ammonia and/or an amine in water or a solvent mixture of water with an organic solvent miscible with water. The above water preferably has a less content of cation and preferably has an electrical conductivity of $0.5 \times 10^{-4}$ S/cm or less. Further, examples of the organic solvent miscible with water include those examples that are given in the explanation of the preparation of a seed-particles-forming solution in the above (1).

Advantageously, the amount of the aqueous solution containing ammonia and/or an amine is determined such that the solution of seed particles after the formation of the seed particles preferably has a pH in the range of 8.2 to 11.0.

While the reaction temperature differs depending upon kinds of the silicon compound as a raw material, it is generally determined to be in the range of 0 to 50° C. When it is lower than 0° C., the aqueous medium used is frozen and can no longer exhibit its function. When the synthesis is carried out at 50° C. or higher, the alkoxide used is vaporized, which decreases the yield. When polyorganosiloxane particles having a relatively large particle diameter (particle diameter of over 10 μm up to approximately 30 μm) are produced, preferably, they are produced at 5° C. to 30° C. When polyorganosiloxane particles having a small diameter (1 μm to 10 μm) are produced, preferably, they are produced at 35° C. to 40° C.

Generally, it is sufficient to take 1 hour or less for forming the seed particles. When seed particles are formed by a two-layer method, it takes approximately 4 to 10 hours. However, when the method based on a homogeneous system is employed like the present invention, the seed particles can be formed for a far shorter period of time.

After the seed particles are formed, the obtained seed particles are measured for a diameter. While the method for particle diameter measurement is not specially limited, they can be measured by a Coalter method or with an optical microscope video micrometer. In view of easiness in measurement procedures and readiness, it is preferred to make the measurement by a Coalter method.

The above Coalter method refers to a measurement method using a device for electrically measuring particles dispersed in a solution for sizes. This device has a constitution in which a tube having a fine aperture (aperture tube) is provided in an electrolyte in which particles to be measured are suspended or dispersed, electrodes are disposed inside and outside the aperture tube and an electric current flows from one electrode to the other through the electrolyte. Measurement particles dispersed in the electrolyte are attracted, and when they pass the fine aperture of the aperture tube, an electrolyte corresponding to the volume of the particles is replaced to cause a change in electric resistance between the two electrodes. This change in electric resistance is converted to a voltage pulse, and the pulse is amplified and detected to measure a particle diameter.

As a protective-colloid-forming agent for suspending particles in the particle diameter measurement, various materials are used. Examples thereof include anionic surfactants such as alkylaryl sulfonic acid salts including sodium alkylbenzenesulfonate, alkylsulfonic acid salts including sodium dodecylbenzenesulfonate and fatty acid soaps including sodium laurate and polymer surfactants such as polymethacrylic acid, alginic acid, polymaleic acid and polyvinyl alcohol, and it is preferred to use polyvinyl alcohol. These protective-colloid-forming agents may be used singly or may be used in combination of at least two members of these.

The present invention is concerned with the method in which seed particles having a particle diameter smaller than an intended final particle diameter are formed and then the seed particles are grown up to an intended particle diameter with a particle-diameter-growing aqueous solution. On the other hand, when the particle diameter of the obtained seed particles is too small as compared with an intended final particle diameter, the seed particles can be grown up to a proper particle diameter (smaller than the intended final particle diameter) by a known method as required, for example, by the method described in JP-A-2002-80598, and then the thus-grown seed particles can be subjected to the step of growing the seed particles with the particle-diameter-growing aqueous solution to be described later.

When the seed particles are formed by the procedure (2) of forming seed particles, a pre-prepared solution containing polyorganosiloxane particles (to be referred to as "particles-containing solution for addition" hereinafter) may be added together with the seed-particles-forming solution and the catalyst. The particles-containing solution for addition is prepared as follows.

(Preparation of Particles-containing Solution for Addition)

A predetermined silicon compound is added to an aqueous medium, the mixture is generally stirred at a temperature of approximately 0 to 50° C. to form a substantially homogenous aqueous solution, a basic catalyst is added, the above silicon compound is caused to undergo hydrolysis and condensation to form particles, and a particles-containing solution for addition is thereby prepared.

The above aqueous medium can be selected from water or a mixture of water with an organic solvent miscible with water. Examples of the above organic solvent miscible with water include lower alcohols such as methanol, ethanol, propanol and butanol, and ketones such as acetone. These may be singly mixed with water, or at least two members of these may be combined and mixed with water.

Further, as a basic catalyst, preferably, an aqueous solution containing ammonia and/or an amine is added at once to cause the silicon compound to undergo hydrolysis and condensation to form particles for addition, and a particles-containing solution for addition is thereby formed.

Examples of the above amine preferably include monomethylamine, dimethylamine, monoethylamine, diethylamine and ethylenediamine. The above ammonia and the above amines may be used singly or in combination of at least two members of them. However, ammonia is preferred since it is less toxic, easy to remove and less expensive.

Further, as an aqueous solution containing ammonia and/or an amine, there can be employed a solution of ammonia and/or an amine in water or a solvent mixture of water with an organic solvent miscible with water. Examples of the organic solvent miscible with water include those that are given as examples hereinabove.

The concentration of the silicon compound in the aqueous solution is preferably 20 mass % or less, and it is suitably in the range of 5 to 15 mass % in view of the particles diameter of particles to be formed and volume efficiency. Advantageously, the amount of the aqueous solution containing ammonia and/or an amine is determined such that the particles-containing solution for addition after the formation of the particles preferably has a pH in the range of 8.0 to 10.5. Concerning the reaction time period, generally, it is sufficient to take one hour or less.

The thus-formed particles for addition generally have an average particle diameter of approximately 3.0 to 6.0 µm.

While the silicon compound, the aqueous medium, the basic catalyst, etc., used for preparing the particles for addition may be the same as, or may be different from, those used for producing the seed particles in kind, they are preferably identical in view of workability and properties of the particles.

When the particles-containing solution for addition is used, there are obtained seed particles having a larger particle diameter than seed particles obtained without using it. The reason therefor is not clear. However, it is presumably because the number of seed particles formed in the presence of the particles for addition is smaller than the number of seed particles formed in the absence of them. In a solution in the formation of seed particles in the presence of the particles for addition, a reaction to generate cores that come to constitute seed particles and a reaction to grow the particles for addition take place at the same time, which is assumed to be a primary factor for the above reason.

When the particles for addition are used in combination, preferably, the ratio (to be referred to as "number ratio" hereinafter) of the number of particles newly formed to the number of particles in the added particles-containing solution for addition after the formation of the seed particles is at least 2. In the present invention, the particles newly formed in the formation of seed particles are grown, and the grown particles constitute polyorganosiloxane particles as an end product. When the above number ratio is less than 2, therefore, the presence of the particles for addition in the seed particles is no more negligible, and the yield of the polyorganosiloxane particles obtained as an end product is low, which may be sometimes industrially disadvantageous. Further, when the above number ratio is too large, there is not fully exhibited the effect of increasing the particle diameter of the particles to be newly formed, and it is difficult to accomplish the object of the added particles-containing solution for addition. The number ratio is more preferably from 4 to 50, and particularly preferably in the range of 20 to 45.

In the present invention, the above number ratio can be obtained in a manner in which, after the formation of the seed particles, part of a solution of seed particles is sampled and brought into contact with a protective-colloid-forming agent to form a protective colloid of the seed particles, the seed particles are measured for a particle diameter, for example, by a Coalter method to determine an average particle diameter of particles to which the particles for addition have grown and an average particle diameter of the newly formed particles and the above number is calculated.

A protective colloid is formed as described above, whereby stable measurement can be made without any shrinkage of the particles in diameter during the measurement by the Coalter method. Examples of the above protective-colloid-forming agent include anionic surfactants such as alkyl aryl sulfonic acid salts including sodium alkylbenzenesulfonate, alkyl sulfonic acid salts including sodium dodecylsulfonate and fatty acid soaps including sodium laurate and polymer surfactants such as polymethacrylic acid, alginic acid, polymaleic acid and polyvinyl alcohol. Of these, polyvinyl alcohol is particularly preferred. These protective-colloid-forming agents may be used singly or may be used in combination of at least two members of these.

Step (B)

In the first to third embodiments of the present invention, the step (B) is a step in which a particle-diameter-growing aqueous solution containing a silicon compound of the above general formula (I) or a hydrolyzate thereof is added to the seed-particles-containing solution obtained in the step (A) and the above seed particles are grown, and the step (B) includes the following procedures (3) and (4).

(3) Preparation of particle-diameter-growing aqueous solution (4) Growing to intended particle diameter and subsequent termination of reaction The above procedures (3) and (4) will be explained in detail below.

(3) Preparation of Particle-diameter-growing Aqueous Solution

As a particle-diameter-growing aqueous solution, an aqueous solution containing a silicon compound of the above general formula (I) or a hydrolyzate thereof is used. The silicon compound of the general formula (I) includes the foregoing various silicon compounds. Further, the hydrolyzate of silicon compound of the general formula (I) refers to a material obtained by partially or completely hydrolyzing a silicon compound having 1 to 3 alkoxyl groups, represented by the general formula (I).

The aqueous solution containing the silicon compound or the hydrolyzate thereof is prepared using, as a medium, water or a mixture of water with an organic solvent miscible with water as used for the preparation of the seed-particles-forming solution in the procedure (1) of the above step (A) or an aqueous solution containing ammonia and/or an amine as used in the formation of seed particles in the above procedure (2).

In the preparation of the above particle-diameter-growing aqueous solution, the silicon compound, the concentration thereof and the aqueous medium may be identical to, or may be different from, those of the above seed-particles-forming solution, while they are preferably identical in view of workability and properties of particles to be obtained.

The concentration of the silicon compound is preferably 20 mass % or less, and it is particularly suitably in the range of 5 to 15 mass % in view of the particle diameter of grown particles and volume efficiency.

The aqueous solution containing the silicon compound of the general formula (I) or a hydrolyzate thereof, for use as the above particle-diameter-growing aqueous solution, is subjected to a reaction in the following procedure (4) while it is in a homogeneous solution state.

In the third embodiment of the present invention, the above particle-diameter-growing aqueous solution further contains an anionic surfactant as an essential component. The anionic surfactant in the particle-diameter-growing aqueous solution will be discussed in detail later with regard to its concentration, and the like.

(4) Growing to Intended Particle Diameter and Subsequent Termination of Reaction The procedure (4) is carried out in a manner in which the particle-diameter-growing aqueous solution obtained in the above procedure (3) is added to the seed-particles-containing solution obtained in the above procedure (2) of the step (A) while the particle-diameter-growing aqueous solution is stirred, and the seed particles are grown up to an intended particle diameter, or in which the seed-particles-containing solution obtained in the procedure (2) of the step (A) is added to the particle-diameter-growing aqueous solution obtained in the above procedure (3) while the particle-diameter-growing aqueous solution is stirred and the seed particles are grown up to an intended particle diameter. While the reaction temperature therefor differs depending upon kinds of the silicon compound as a raw material, it is generally determined to be in the range of 0 to 50° C.

When the particle-diameter-growing aqueous solution is added to the seed-particles-containing solution, the particle-diameter-growing aqueous solution can be added continuously, and in this case, the addition rate of the particle-diameter-growing aqueous solution is not specially limited. However, the addition rate per ml of volume of the seed-particles-containing solution is preferably 0.02 ml/minute or less, more preferably 0.01 ml/minute or less. When polyorganosiloxane particles having a large particle diameter (over 10 μm) are obtained, and when the above addition rate per ml of the seed-particles-containing solution exceeds 0.01 ml/minute, fine particles sometimes occur in the entire particles, and there are observed particles each of which has a portion having a different refractive index in each particle, so that it is preferred to adjust the above addition rate to 0.01 ml/minute or less per ml of volume of the seed-particles-containing solution. The above particles with portions having a different refractive index are considered to have gas bubbles, so that they will be called "foamed particles" hereinafter.

The constitutional requirements for working the step (B) of growing a particle diameter, characteristic of the second and third embodiments of the present invention, will be explained, respectively.

The second embodiment of the present invention has an essential requirement that particles are measured continuously or at intervals of a constant time period until a predetermined final particle diameter is reached in the procedure (4) of the step (B).

The method for the above measurement of the particles for a diameter is not specially limited, and various methods can be employed. Preferably, part of the reaction solution is sampled, the sampled solution is brought into contact with a protective-colloid-forming agent to form a protective colloid of the particles in the reaction solution, and the particles are measured for a diameter by the Coalter method or with an optical microscope video micrometer, and it is particularly preferred to make the measurement by the Coalter method. The particles are measured for a diameter as described in detail in the formation of the seed particles in the above procedure (2) of the step (A).

After the above particle-diameter-growing aqueous solution is added, and when it is found that the intended particle diameter of the polyorganosiloxane particles is reached, the addition of the particle-diameter-growing aqueous solution is terminated.

The third embodiment of the present invention has an essential requirement that a particle-diameter-growing aqueous solution containing an anionic surfactant is added to the seed-particles-containing solution when the seed particles are grown to an intended diameter in the procedure (4) of the step (B).

The above addition of an anionic surfactant can prevent aggregation caused by hydrophobic nature that the particles exhibit as a surface property on the basis of a non-hydrolyzable group as the hydrolysis and condensation of particle surfaces proceed during the growing of the particles in diameter. The above anionic surfactant preferably has an HLB value (index for a balance between hydrophilic nature and lipophilic nature) in the range of 15 to 42, more preferably has an HLB value in the range of 15 to 40. Further, as an anionic surfactant, higher alcohol sulfuric acid ester salt (long-chain alkyl sulfate) is preferred, and sodium dodecyl sulfate is particularly suitable.

In the third embodiment of the present invention, the above anionic surfactant is contained in the particle-diameter-growing aqueous solution such that the concentration thereof in the particle-diameter-growing aqueous solution satisfies the relational expression (II), $$Y=\alpha \times (a \times X)/(A \times R) \quad \text{(II)}$$

wherein a is a theoretical value obtained by dividing a molecular weight of a product that is a hydrolysis and condensation product of the silicon compound with a molecular weight of the silicon compound, Y is a concentration (mass %) of the anionic surfactant in the particle-diameter-growing aqueous solution, X is a mass (g) of the raw material to be used for synthesis of the seed particles, A is a total mass (g) of the solutions for use in the step (B) of growing seed particles, R is an average particle diameter (μm) of the seed particles, and α is a coefficient in the range of $4.0 < \alpha \leqq 75$.

In the above relational expression, the total mass of the solutions for use in the step (B) of growing seed particles, represented by A, refers to a total sum of the mass of the silicon compound and the mass of the aqueous media such as ion-exchanged water, etc., used in the step (B) of growing the seed particles.

When the concentration Y of the anionic surfactant in the particle-diameter-growing aqueous solution is lower than the value calculated from the relational expression (II), the particles aggregate due to hydrophobic nature based on non-hydrolyzable groups on surfaces of the particles, and the object of the present invention is not accomplished. When Y is higher than the value calculated from the relational expression (II), the growing rate of the particles decreases to a great extent, and when, for example, ammonia is added at a stage where an intended particle diameter is reached, particles having gas bubbles inside them are formed, so that the obtained particles are poor in compressive strength. The value of a in the above relational expression (II) is preferably greater than 4.0 but 70 or less, particularly preferably in the range of 20 to 60.

In the third embodiment of the present invention, preferably, while the particle-diameter-growing solution containing the above anionic surfactant is stirred, the above seed-particles-forming solution is added thereto to grow the particles in diameter. Further, the growing of the particles in diameter can be carried out at multi-stages as required. When the growing of the particles in diameter is carried out at multi-stages, preferably, while the pre-prepared particle-diameter-growing aqueous solution containing no surfactant is stirred, the particle-diameter-growing solution obtained by the procedure of growing the particles in diameter in the previous step is added as a solution of the seed particles, to grow the particles in diameter.

In any one of the first to third embodiments of the present invention, after the addition of the seed-particles-containing solution, the particles can be measured continuously or at intervals of a constant time period for confirming a growing state of diameter of the particles, and when a change in the above diameter of the particles disappears, it can be decided that the growth of the particles in diameter comes to an end, and the subsequent reaction can be terminated.

In any one of the first to third embodiments of the present invention, it is sufficient to carry out the above growth of the particles in diameter within 3 hours. When a two-layer method is employed to grow particles in diameter, it generally takes approximately 6 to 10 hours. By carrying out the reaction in a substantially homogeneous state as is done in the present invention, the particles can be grown in diameter for a far shorter period of time. In the two-layer method, a silicon compound of an upper layer undergoes self-condensation due to water in air to be altered, and it comes to have the form, for example, of thick syrup and winds itself around a stirring blade, or the amount of the silicon compound to be used for growing the particles in diameter decreases, so that sometimes particles having a desired particle diameter cannot be obtained. In the method of the present invention, however, the particles are grown in the homogeneous system, so that such a problem does not take place.

In any one of the first to third embodiments of the present invention, when it is confirmed that the intended particle diameter of the polyorganosiloxane particles is reached, a basic catalyst, such as an aqueous solution containing ammonia and/or an amine is added, to age the particles. Although differing depending upon kinds of the silicon compound as a raw material, the aging is generally carried out at a temperature in the range of 0 to 50° C. for 6 to 24 hours.

After completion of the above aging procedure, the formed particles are fully washed according to a conventional method, and then, particles having a higher ratio of particle diameter among them are taken out by classification as required and then dried. Particles having a lower rate of particle diameter do not specially degrade the CV value, so that they can be taken out by classification and used in some cases. Although the method for the classification is not specially limited, a wet classification method is preferred in which the classification is carried out using a difference in sedimentation velocity among particles. When the polyorganosiloxane particles are formed into silica particles as an end product, preferably, the above wet classification is carried out after the formation of silica particles when water can be used, in view of a cost and environmental protection. The drying procedure is generally carried out at a temperature in the range of 100 to 200° C. In the present invention, the aggregation of particles substantially does not take place in this drying procedure.

The coefficient of variation (CV value) can be determined on the basis of the following expression.

$$CV \text{ value (\%)} = (\text{standard deviation of particle diameters/average particle diameter}) \times 100$$

The average particle diameter and the CV value in the present invention are calculated by the following method. First, an isolated particle diameter distribution peak width is pre-selected, as a measurement range, from a measurement result obtained by the Coalter method, and a preliminary average particle diameter and σ (standard deviation) are calculated. A range of ±3σ is selected from the preliminary average particle diameter value, and an average particle diameter and a CV value are newly calculated in the range. When a plurality of isolated particle diameter distribution peaks are present, the calculation is carried out for each peak.

The polyorganosiloxane particles obtained in the first embodiment of the present invention generally have an average particle diameter of greater than 10 μm and preferably have an average particle diameter of 12.5 to 25 μm. Further, the coefficient of variation (CV value) of their particle size distribution is generally 5% or less, preferably 2.5% or less, and they are spherical monodisperse particles. In this embodiment, seed particles having a large particle diameter can be formed as compared with any conventional method, and as a result, polyorganosiloxane particles having a large particle diameter and a monodisperse particle diameter distribution can be efficiently produced by growing the above seed particles or sometimes even without carrying out the growing procedure.

The polyorganosiloxane particles obtained in the second embodiment of the present invention has an average particle diameter of 1 to 30 μm, preferably 3 to 25 μm, more preferably 3 to 20 μm. Further, the coefficient of variation (CV value) of their particle size distribution is 3% or less, preferably 2.5% or less, and they are spherical monodisperse particles. In this embodiment, when the particle-diameter-growing aqueous solution is added, it is not required to carry out any one of the calculation of dilution ratio of the seed-particles-growing solution and the dilution procedure, and the polyorganosiloxane particles can be produced by simple procedures. Further, the particle diameter of polyorganosiloxane particles to be obtained can be controlled in the order of nm.

The polyorganosiloxane particles obtained in the third embodiment of the present invention generally have an average particle diameter of over 10 μm, and preferably have an average particle diameter of 12.5 to 25 μm. Further, the coefficient of variation (CV value) of their particle size distribution is generally 2.5% or less, and they are spherical monodisperse particles. In this embodiment, when the particle-diameter-growing aqueous solution is added, it is not required to carry out any one of the calculation of dilution ratio of the seed-particles-growing solution and the dilution procedure, and the polyorganosiloxane particles can be produced by simple procedures.

The method for producing silica particles, provided by the present invention, will be explained below.

This method is a method in which polyorganosiloxane particles are calcined to decompose an organic group contained therein, whereby silica particles are produced. And, as the above polyorganosiloxane particles, the polyorganosiloxane particles obtained by any one of the above production methods are used.

In this method, the polyorganosiloxane particles obtained in any one of the first to third embodiments of the present invention are pre-calcined at a temperature that is higher than the temperature which is lower than a decomposition temperature of the organic group contained therein by 150° C. and that is in a temperature range lower than the decomposition temperature of the organic group, and then the polyorganosiloxane particles are calcined at a temperature of the decomposition temperature of the organic group or higher, to produce silica particles.

When the calcining is carried out by increasing the temperature directly to the decomposition temperature of the organic group contained in the above polyorganosiloxane particles or higher, there are sometimes caused undesirable states where the organic group is sharply decomposed or eliminated, the disruptive strength of the particles decreases and the particles are broken since they cannot withstand their sharp shrinkage. However, when the particles are pre-calcined at a temperature that is higher than the temperature which is lower than a decomposition temperature of the above organic group contained therein by 150° C. and that is in a temperature range lower than the decomposition temperature of the organic group and then are calcined at a temperature of the decomposition temperature of the organic group or higher as specified in the present invention, the above undesirable states can be avoided. Preferably, the particles are pre-calcined at a temperature that is lower than the decomposition temperature of the above organic group by 100° C. or less and that is in a temperature range lower than the decomposition temperature of the organic group, and then are calcined at a temperature of the decomposition temperature of the organic group or higher or higher. The time period for the calcining depends upon kinds of the organic group constituting the polyorganosiloxane particles. When the particles have an easily pyrolyzable organic group, desirably, the calcining is carried out at a relatively low temperature. On the other hand, when the particles have an organic group that is difficult to pyrolyze, preferably, the calcining is carried out at a high temperature. In any case, optimum conditions can be determined depending upon required disruptive strength and elastic modulus. Specifically, when the particles are polymethylsilsesquioxane (PMSO), the particles are maintained at a temperature in the range of 250 to 350° C. for approximately 3 to 50 hours to carry out the pre-calcining, and then they are maintained at a temperature in the range of 500 to 1,300° C. (preferably, in the range of 500 to 1,000° C.) for approximately 3 to 50 hours to completely decompose the organic group. The atmosphere in the above calcining is preferably an atmosphere having a certain oxygen concentration or higher, for example, at least 10 volume %, for forming silica by oxidation-decomposing the organic group. Further, the calcining apparatus is not specially limited, and it can be selected from known calcining apparatuses such as an electric furnace, a rotary kiln, and the like.

The present invention will be explained in detail with reference to Examples hereinafter, while the present invention shall not be limited by these Examples.

EXAMPLE 1

Production of Polyorganosiloxane Particles According to the First Embodiment (1) Preparation of Seed-particles-forming Solution To 5,000 g of ion-exchanged water were added 0.8 ml ($NH_3$: 2.7 ppm) of 1 mol/liter aqueous ammonia and 500 g of methyltrimethoxysilane (to be abbreviated as "MTMS" hereinafter), and the mixture was stirred at 100 rpm at 25° C. After about 3 hours, a homogeneous solution of completely dissolved MTMS was formed, and the solution was slightly opaque. This solution was used as a seed-particles-forming solution. Fine particles in the seed-particles-forming solution were measured for a particle diameter distribution with a Coalter counter ("Multisizer III" supplied by Beckmann Coalter Corp.). FIG. 1 shows a chart of the above particle diameter distribution.

(2) Preparation of Seed Particles

Figure 2:
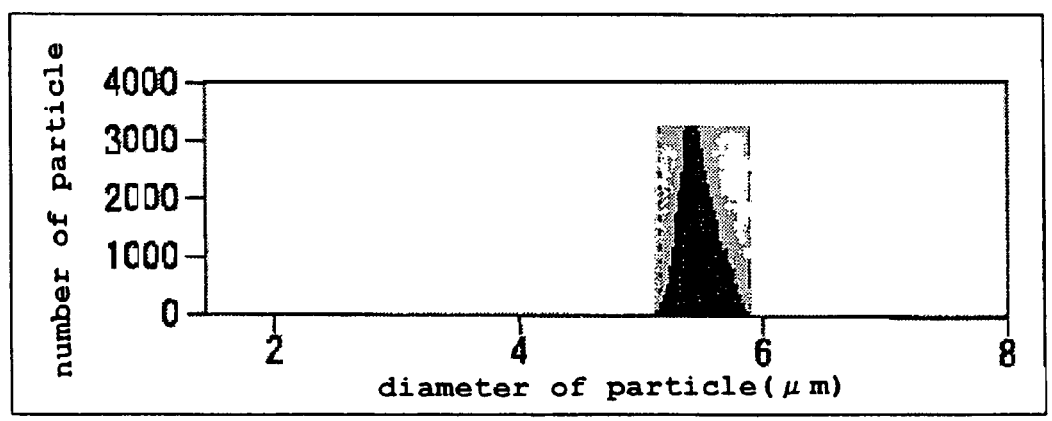
FIG. 2 is a particle diameter distribution chart obtained by measuring seed particles in a seed particle solution in Example 1 for particle diameters with a Coalter counter.

The stirring rate was decreased to 30 rpm, and 50 ml of 1 mol/liter aqueous ammonia was at once added to the seed-particles-forming solution prepared in the above (1). To 2 ml of a 0.1 mass % polyvinyl alcohol aqueous solution was added 0.2 ml of the seed particle solution obtained 20 minutes after the addition, and the seed particles in the seed particle solution were measured for a particle diameter distribution with a Coalter counter ("Multisizer III" supplied by Beckmann Coalter Corp.). FIG. 2 shows a chart of the above particle diameter distribution. The seed particles had an average particle diameter of 5.477 μm and a CV value of 2.57%.

(3) Preparation of Particle-diameter-growing Aqueous Solution

To 33,000 g of ion-exchanged water was added 4,950 g of MTMS, and the mixture was stirred at 100 rpm at 30° C. After about 3 hours, a homogeneous solution of completely dissolved MTMS was formed, and the solution was used as a particle-diameter-growing aqueous solution.

(4) Growth to Intended Particle Diameter and Subsequent Termination of Reaction

While the entire amount of the particle-diameter-growing aqueous solution in the above (3) was stirred at 20 rpm, 5,528 g of the seed-particles-containing solution obtained in the above (2) was added thereto.

Particles were measured for a particle diameter with an optical microscope video micrometer (Video micrometer "VM-50", supplied by Olympus Optical Co., Ltd.) at intervals of 10 minutes after the addition of the seed-particles-containing solution. Thirty minutes and 35 minutes after the addition, the particles had an average particle diameter of approximately 14.8 μm in each time, and it was judged that the particle diameter growth ended, so that 1,000 g of 2.5 mass % aqueous ammonia was dropwise added with a metering pump to carry out aging.

Figure 3:
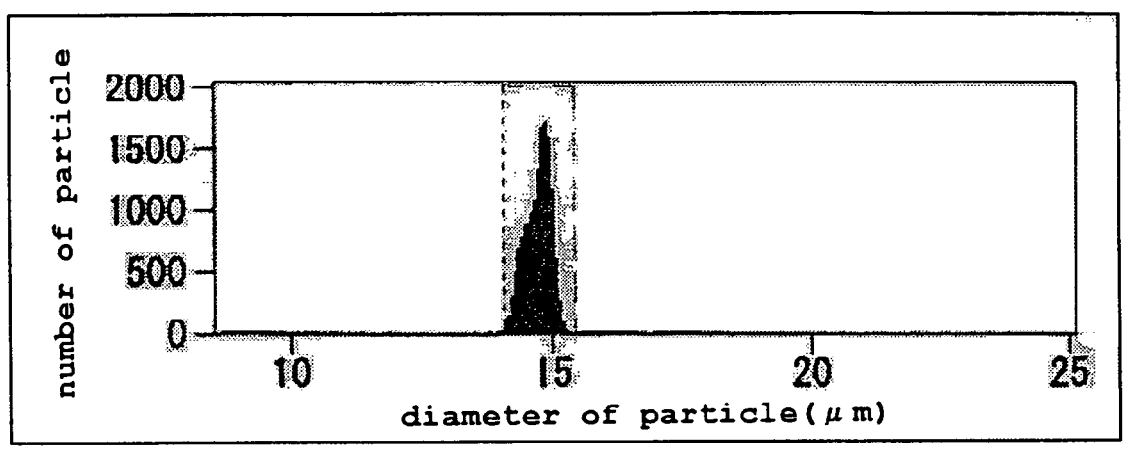
FIG. 3 is a particle diameter distribution chart obtained by measuring polymethylsilsesquioxane particles in a particle-diameter-growing solution in Example 1 for particle diameters with a Coalter counter.

The thus-obtained polymethylsilsesquioxane (PMSO) particles were measured for a particle diameter distribution with a Coalter counter ("Multisizer III" supplied by Beckmann Coalter Corp.). FIG. 3 shows a chart of the above particle diameter distribution. The above PMSO particles had an average particle diameter of 14.73 μm and a CV value of 1.63%.

(5) Classification of Fine Particles and Drying

The obtained particles were subjected to solid-liquid separation with a centrifugal separator, and then the procedures of irradiation with ultrasonic wave in methanol and subsequent decantation were repeated several times, to remove fine particles. The remaining particles were air-dried and then dried at 150° C. to remove residual methanol. The yield of the thus-obtained PMSO particles was 70%.

EXAMPLE 2

Production of Silica Particles

The PMSO particles obtained in Example 1 were temperature-increased from room temperature up to 300° C. under a condition of an air flow rate of 1 liter/minute and pre-calcined by maintaining them at this temperature for 24 hours. Then, the particles were temperature-increased to 550° C. and regularly calcined at this temperature by maintaining them at this temperature for 9 hours. After the regular calcining, the calcined particles were cooled to room temperature and taken out. When the above calcined particles were dispersed in water and then left for a certain period of time, there appears a state in which they are separated into three layers, a layer containing a group of particles whose number is the largest, a layer containing only particles having a larger size than the group and a layer containing only particles having a smaller size than the group. In this state, the procedure of extracting and removing a layer of particles having a smaller size was repeatedly carried out until the layer came to be transparent, to remove particles smaller than intended particles. Concerning the remaining layers, intended particles alone are contained in the vicinity of the transparent supernatant free of particles due to a difference in sedimentation velocity based on volumes, so that the procedure of extracting this portion was repeatedly carried out, to separate the intended particles. The particles obtained after the classification were measured for a particle diameter with a Coalter counter ("Multisizer III" supplied by Beckmann Coalter Corp.) to show an average particle diameter of 11.93 μm and a CV value of 1.75%.

EXAMPLE 3

Production of Polyorganosiloxane Particles According to the First Embodiment (1) Preparation of Seed-particles-forming Solution To 5,000 g of ion-exchanged water were added 0.8 ml ($NH_3$: 2.7 ppm) of 1 mol/liter aqueous ammonia and 500 g of MTMS, and the mixture was stirred at 100 rpm at 25° C. After about 3 hours, a homogeneous solution of completely dissolved MTMS was formed, and the solution was slightly opaque. This solution was used as a seed-particles-forming solution.

(2) Preparation of Seed Particles

The stirring rate was decreased to 30 rpm, and 50 ml of 1 mol/liter aqueous ammonia was at once added to the seed-particles-forming solution prepared in the above (1). To 2 ml of a 0.1 mass % polyvinyl alcohol aqueous solution was added 0.2 ml of the seed particle solution obtained 20 minutes after the addition, and the seed particles in the seed particle solution were measured for a particle diameter distribution with a Coalter counter ("Multisizer III" supplied by Beckmann Coalter Corp.). As a result, the seed particles had an average particle diameter of 7.184 μm and a CV value of 2.37%.

(3) Preparation of Particle-diameter-growing Aqueous Solution

To 26,400 g of ion-exchanged water was added 3,960 g of MTMS, and the mixture was stirred at 100 rpm at 30° C. After about 3 hours, a homogeneous solution of completely dissolved MTMS was formed, and 13.2 g of sodium dodecyl sulfate was added thereto. This mixture was used as a particle-diameter-growing aqueous solution.

As will be described later, a particle-diameter-adjusting solution was added after the addition of the particle-diameter-growing aqueous solution. The particle-diameter-adjusting solution was prepared as follows.

To 8,000 g of ion-exchanged water was added 1,200 g of MTMS, and the mixture was stirred at 100 rpm at room temperature. After about 3 hours, a homogeneous solution of completely dissolved MTMS was formed, and this solution was used as the particle-diameter-adjusting solution.

(4) Growth to Intended Particle Diameter and Subsequent Termination of Reaction

While the entire amount of the above particle-diameter-growing aqueous solution in the above (3) was stirred at 20 rpm, 5,525 g of the seed-particles-containing solution obtained in the above (2) was added thereto. In 30 minutes after the addition of the seed particle solution, 0.2 ml of the particles-growing solution was added to 2 ml of a 0.1 mass % polyvinyl alcohol aqueous solution, and particles were measured for a particle diameter with a Coalter counter ("Multisizer III" supplied by Beckmann Coalter Corp.). As a result, the particles had an average particle diameter of 13.37 μm and a CV value of 1.14%, and the particle diameter was a little smaller than an intended diameter.

Therefore, the particle-diameter-adjusting solution in the above (3) was dropwise added with a metering pump over approximately 40 minutes, and the particles were observed for particle growth with a Coalter counter ("Multisizer III" supplied by Beckmann Coalter Corp.) in the same manner as in the above. In 120 minutes after the addition, an intended average particle diameter of 14.83 μm (CV value 0.97%) was attained. For terminating the growth in particle diameter, 1,000 g of 2.5 mass % aqueous ammonia was dropwise added with a metering pump to carry out aging.

The thus-obtained particles were measured for a particle diameter with a Coalter counter ("Multisizer III" supplied by Beckmann Coalter Corp.) to show an average particle diameter of 14.80 µm and a CV value of 1.93%.

(5) Classification of Fine Particles and Drying

The obtained particles were subjected to solid-liquid separation with a centrifugal separator, and then the procedures of irradiation with ultrasonic wave in methanol and subsequent decantation were repeated several times, to remove fine particles. The remaining particles were air-dried and then dried at 150° C. to remove residual methanol. The yield of the thus-obtained PMSO particles was 75%.

EXAMPLE 4

Production of Silica Particles

The PMSO particles obtained in Example 3 were calcined and classified in the same manner as in Example 2, to give calcined particles having an average particle diameter of 11.99 µm and a CV value of 1.85%.

EXAMPLE 5

Production of Polyorganosiloxane Particles According to the First Embodiment (1) Preparation of Seed-particles-forming Solution To 5,000 g of ion-exchanged water were added 0.8 ml (NH$_3$: 2.7 ppm) of 1 mol/liter aqueous ammonia and 750 g of MTMS, and the mixture was stirred at 100 rpm at 25° C. After about 3 hours, a homogeneous solution of completely dissolved MTMS was formed, and the solution was slightly opaque. This solution was used as a seed-particles-forming solution.

(2) Preparation of Seed Particles

In the seed-particles-forming solution prepared in the above (1), the stirring rate was decreased to 50 rpm, and 50 ml of 1 mol/liter aqueous ammonia was at once added thereto. To 2 ml of a 0.1 mass % polyvinyl alcohol aqueous solution was added 0.2 ml of the seed particle solution obtained 20 minutes after the addition, and the seed particles in the seed particle solution were measured for a particle diameter with a Coalter counter ("Multisizer III" supplied by Beckmann Coalter Corp.). As a result, the seed particles had an average particle diameter of 11.11 µm and a CV value of 2.19%.

(3) Preparation of Particles-diameter-growing Aqueous Solution

To 33,000 g of ion-exchanged water was added 4,950 g of MTMS, and the mixture was stirred at 100 rpm at 30° C. After about 3 hours, a homogeneous solution of completely dissolved MTMS was formed, and 16.5 g of sodium dodecyl sulfate was added thereto. This mixture was used as a particle-diameter-growing aqueous solution.

(4) Growth to Intended Particle Diameter and Subsequent Termination of Reaction

While the entire amount of the particle-diameter-growing aqueous solution in the above (3) was stirred at 20 rpm, 5,778 g of the seed-particles-containing solution obtained in the above (2) was added thereto.

Particles were measured for a particle diameter with an optical microscope video micrometer (Video micrometer "VM-50", supplied by Olympus Optical Co., Ltd.) at intervals of 10 minutes after the addition of the seed-particles-containing solution. Sixty minutes and 65 minutes after the addition, the particles had an average particle diameter of approximately 23.6 µm in each time, and it was judged that the particle diameter growth ended, so that 1,000 g of 2.5 mass % aqueous ammonia was dropwise added with a metering pump to carry out aging.

The thus-obtained polymethylsilsesquioxane (PMSO) particles were measured for a particle diameter distribution with a Coalter counter ("Multisizer III" supplied by Beckmann Coalter Corp.). The above PMSO particles had an average particle diameter of 23.30 µm and a CV value of 1.81%.

(5) Classification of Fine Particles and Drying

The obtained particles were subjected to solid-liquid separation with a centrifugal separator, and then the procedures of irradiation with ultrasonic wave in methanol and subsequent decantation were repeated several times, to remove fine particles. The remaining particles were air-dried and then dried at 150° C. to remove residual methanol. The yield of the thus-obtained PMSO particles was 65%.

COMPARATIVE EXAMPLE 1

(1) Preparation of Seed-particles-forming Solution

To 5,000 g of ion-exchanged water were added 0.2 ml (NH$_3$: 0.68 ppm) of 1 mol/liter aqueous ammonia and 500 g of MTMS, and the mixture was stirred at 100 rpm at 25° C. After about 3 hours, a homogeneous solution of completely dissolved MTMS was formed, and the solution was transparent. This solution was used as a seed-particles-forming solution.

(2) Preparation of Seed Particles

In the seed-particles-forming solution prepared in the above (1), the stirring rate was decreased to 30 rpm, and 50 ml of 1 mol/liter aqueous ammonia was at once added thereto. To 2 ml of a 0.1 mass % polyvinyl alcohol aqueous solution was added 0.2 ml of the seed particle solution obtained 20 minutes after the addition, and the seed particles in the seed particle solution were measured for a particle diameter with a Coalter counter ("Multisizer III" supplied by Beckmann Coalter Corp.). As a result, the seed particles had an average particle diameter of 2.165 µm and a CV value of 3.95%.

COMPARATIVE EXAMPLE 2

(1) Preparation of Seed-particles-forming Solution

To 5,000 g of ion-exchanged water-were added 2.0 ml (NH$_3$: 6.8 ppm) of 1 mol/liter aqueous ammonia and 500 g of MTMS, and the mixture was stirred at 100 rpm at 25° C. After about 3 hours, a homogeneous solution of completely dissolved MTMS was formed, and the solution was densely opaque. This solution was used as a seed-particles-forming solution.

(2) Preparation of Seed Particles

In the seed-particles-forming solution prepared in the above (1), the stirring rate was decreased to 30 rpm, and 50 ml of 1 mol/liter aqueous ammonia was at once added thereto. To 2 ml of a 0.1 mass % polyvinyl alcohol aqueous solution was added 0.2 ml of the seed particle solution obtained 20 minutes after the addition, and the seed particles in the seed particle solution were measured for a particle diameter with a Coalter counter ("Multisizer III" supplied by Beckmann Coalter Corp.). As a result, the seed particles had an average particle diameter of 2.176 tm and a CV value of 4.21%.

COMPARATIVE EXAMPLE 3

(1) Preparation of Seed-particles-forming Solution

To 5,000 g of ion-exchanged water was added 500 g of MTMS, and the mixture was stirred at 100 rpm at 25° C. After about 3 hours, a homogeneous solution of completely dissolved MTMS was formed, and the solution was transparent. This solution was used as a seed-particles-forming solution.

(2) Preparation of Seed Particles

In the seed-particles-forming solution prepared in the above (1), the stirring rate was decreased to 30 rpm, and 50 ml of 1 mol/liter aqueous ammonia was at once added thereto. To 2 ml of a 0.1 mass % polyvinyl alcohol aqueous solution was added 0.2 ml of the seed particle solution obtained 30 minutes after the addition, and the seed particles in the seed particle solution were measured for a particle diameter with a Coalter counter ("Multisizer III" supplied by Beckmann Coalter Corp.). As a result, the seed particles had an average particle diameter of 2.365 µm and a CV value of 1.56%.

(3) Preparation of Particle-diameter-growing Aqueous Solution

To 33,000 g of ion-exchanged water was added 4,950 g of MTMS, and the mixture was stirred at 100 rpm at 30° C. After about 3 hours, a homogeneous solution of completely dissolved MTMS was formed, and this solution was used as a particle-diameter-growing aqueous solution.

(4) Growth to Intended Particle Diameter and Subsequent Termination of Reaction

While the entire amount of the particle-diameter-growing aqueous solution in the above (3) was stirred at 20 rpm, 3,200 g of the seed-particles-containing solution obtained in the above (2) was added thereto.

Particles were measured for a particle diameter with an optical microscope video micrometer (Video micrometer "VM-50", supplied by Olympus Optical Co., Ltd.) at intervals of 10 minutes after the addition of the seed-particles-containing solution. Thirty minutes and 35 minutes after the addition, the particles had an average particle diameter of approximately 7.2 µm in each time, and it was judged that the particle diameter growth ended, so that 500 g of 2.5 mass % aqueous ammonia was dropwise added with a metering pump to carry out aging.

The thus-obtained PMSO particles were measured for a particle diameter with a Coalter counter to show an average particle diameter of 7.052 µm and a CV value of 1.65%.

(5) Classification of Fine Particles and Drying

The obtained particles were subjected to solid-liquid separation with a centrifugal separator, and then the procedures of irradiation with ultrasonic wave in methanol and subsequent decantation were repeated several times, to remove fine particles. The remaining particles were air-dried and then dried at 150° C. to remove residual methanol. The yield of the thus-obtained PMSO particles was 70%.

COMPARATIVE EXAMPLE 4

(1) Preparation of Seed-particles-forming Solution

To 5,000 g of ion-exchanged water was added 500 g of MTMS, and the mixture was stirred at 100 rpm at 30° C. After about 3 hours, a homogeneous solution of completely dissolved MTMS was formed, and the solution was used as a seed-particles-forming solution.

As will be described later, a particles-containing solution for addition was used together with the seed-particles-forming solution in this Comparative Example. The particles-containing solution for addition was prepared as follows.

To 450 g of ion-exchanged water was added 45 g of MTMS, and the mixture was stirred at 100 rpm at room temperature. For a beginning time period after the addition of MTMS, MTMS was dispersed in an oil drop state in the aqueous solution, and after about 2 hours, a homogeneous solution of completely dissolved MTMS was formed. The stirring rate was decreased to 40 rpm, and 0.72 ml of 1 mol/liter aqueous ammonia was at once added. In 15 minutes after the addition of the aqueous ammonia, particles grew and the solution came to be opaque. After 30 minutes, the particles were measured for a particle diameter with an optical microscope video micrometer (Video micrometer "VM-50", supplied by Olympus Optical Co., Ltd.) to show an average particle diameter of 4.1 µm.

(2) Formation of Seed Particles

In the seed-particles-forming solution prepared in the above (1), the stirring rate was decreased to 30 rpm, and 50 ml of 1 mol/liter aqueous ammonia and 493 g of the particles-containing solution for addition, obtained in the above (1), were added. To 2 ml of a 0.1 mass % polyvinyl alcohol aqueous solution was added 0.2 ml of the seed particle solution obtained 30 minutes after the addition, and immediately thereafter, particles were measured for a particle diameter with a Coalter counter ("Multisizer III" supplied by Beckmann Coalter Corp.). As a result, the newly formed particles had an average particle diameter of 4.456 µm (CV value 1.16%).

(3) Preparation of Particle-diameter-growing Aqueous Solution

To 33,000 g of ion-exchanged water was added 4,950 g of MTMS, and the mixture was stirred at 100 rpm at 20° C. After about 3 hours, a homogeneous solution of completely dissolved MTMS was formed, and this solution was used as a particle-diameter-growing aqueous solution.

(4) Growth to Intended Particle Diameter and Subsequent Termination of Reaction

While the entire amount, 37,950 g, of the particle-diameter-growing aqueous solution obtained in the above (3) was stirred at 20 rpm, 3,410 g of the seed particle solution obtained in the above (2) was added thereto, to grow the particles in diameter.

Particles were measured for a particle diameter with an optical microscope video micrometer (Video micrometer "VM-50", supplied by Olympus Optical Co., Ltd.) at intervals of 10 minutes after the addition of the seed particle solution. One hour and one hour and ten minutes after the addition, the particles had an average particle diameter of approximately 13.8 µm in each time, formation of aggregates was found, and it was therefore judged that the particle diameter growth ended, so that 500 g of 2.5 mass % aqueous ammonia was dropwise added with a metering pump to carry out aging.

The thus-obtained particles were measured for a particle diameter with a Coalter counter ("Multisizer III" supplied by Beckmann Coalter Corp.) to show an average particle diameter of 13.88 µm and a CV value of 1.56%.

(5) Classification of Fine Particles and Drying

The obtained particles were subjected to solid-liquid separation with a centrifugal separator, and then the procedures of irradiation with ultrasonic wave in methanol and subsequent decantation were repeated several times, to remove fine particles. The remaining particles were air-dried and then dried at 150° C. to remove residual methanol. The yield of the thus-obtained PMSO particles was 30%.

COMPARATIVE EXAMPLE 5

The PMSO particles obtained in Comparative Example 4 were calcined and classified in the same manner as in Example 2, to give calcined particles having an average particle diameter of 11.31 µm and a CV value of 1.47%.

EXAMPLE 6

Production of Polyorganosiloxane Particles According to the Second Embodiment (1) Preparation of Seed-particles-forming Solution A separable flask having a stirrer and having a volume of 5,000 ml was charged with 2,500 g of ion-exchanged water and 250 g of MTMS, and the mixture was stirred at 100 rpm in a constant-temperature vessel that was temperature-adjusted to 30° C. For a beginning time period after the addition of MTMS, MTMS was dispersed in an oil drop state in the aqueous solution, and after about 3 hours, a homogeneous solution of completely dissolved MTMS was formed. This solution was used as a seed-particles-forming solution.

(2) Formation of Seed Particles

The stirring rate was decreased to 30 rpm, and 25 ml of 1 mol/liter aqueous ammonia was at once added to the seed-particles-forming solution prepared in the above (1). In one minute after the addition of the aqueous ammonia, polymethylsilsesquioxane particles were formed, and the solution came to be opaque.

Thirty minutes and 40 minutes after the addition, 0.2 ml of the seed particle solution was sampled each time, 2 ml of a 0.1 mass % polyvinyl alcohol aqueous solution was added, and immediately thereafter, 50,000 particles were measured for a particle diameter with a Coalter Counter Multisizer II (supplied by Coalter Corp.) each time. As a result, both of the seed particle solutions had an average particle diameter of 2.85 µm (CV value 2.24%), and it was confirmed that the growth of the particles ended. However, it was smaller than an intended final particle diameter of 3.00 µm by 0.15 µm.

(3) Preparation of Particles-diameter-growing Aqueous Solution

A separable flask having a stirrer and a volume of 5,000 ml was charged with 2,500 g of ion-exchanged water and 250 g of MTMS, and the mixture was stirred at 100 rpm in a constant-temperature vessel that was temperature-adjusted to 30° C. For a beginning time period after the addition of MTMS, MTMS was dispersed in an oil drop state in the aqueous solution, and after about 3 hours, a homogeneous solution of completely dissolved MTMS was formed. This solution was used as a particle-diameter-growing aqueous solution.

(4) Growth to Intended Particle Diameter and Subsequent Termination of Reaction

To the solution of the polymethylsilsesquioxane seed particles whose diameter did not reach the intended final particle diameter in the above (2) was dropwise added the particle-diameter-growing aqueous solution in the above (3) with a metering pump at a rate of 10 ml/minute (0.0036 ml/minute per milliliter of volume of the seed particle solution), to initiate mixing.

Particles were observed for particle growth by the Coalter method at intervals of 5 minutes under the same conditions as in (2) until the particles grew in particle diameter by 0.15 µm. At a stage when 900 ml of the particle-diameter-growing aqueous solution was added after the initiation of the addition, it was found that the intended polymethylsilsesquioxane particles having a diameter of 3.00 µm (CV value 2.07%) were obtained. Immediately thereafter, the addition of the particle-diameter-growing aqueous solution was terminated, a mixture solution containing 15 g of 25 mass % aqueous ammonia and 35 g of ion-exchanged water was dropwise added with a metering pump, and the particles were aged at room temperature for 16 hours.

(5) Classification of Fine Particles and Drying

The polymethylsilsesquioxane-particles-containing solution obtained in (4) was centrifugally separated to separate the particles, and then the procedures of irradiation with ultrasonic wave in methanol and subsequent decantation were repeated a plurality of times, to remove fine particles. The remaining polymethylsilsesquioxane particles were air-dried and then heated to 150° C. to dry them for removing residual methanol.

The thus-obtained polymethylsilsesquioxane particles were measured for a particle diameter by the Coalter method in the same manner as in (2), to show an average particle diameter of 3.00 µm (CV value 2.01%).

COMPARATIVE EXAMPLE 6

The same procedures as those described in (1) Preparation of seed-particles-forming solution and (2) Formation of seed particles in Example 6 were carried out.

As a result, polyorganosiloxane particles having an average particle diameter of 2.85 µm (CV value 2.24%) were obtained, while their particle diameter was smaller than an intended final particle diameter of 3.00 µm by 0.15 µm.

When Example 6 and Comparative Example 6 are compared, it can be seen that in the present invention polyorganosiloxane particles having a monodisperse particle diameter distribution can be produced while adjusting their particle diameter in the order of nm.

EXAMPLE 7

Production of Polyorganosiloxane Particles According to the Second Embodiment (1) Preparation of Seed-particles-forming Solution A separable flask having a stirrer and having a volume of 10,000 ml was charged with 5,000 g of ion-exchanged water and 500 g of MTMS, and the mixture was stirred at 100 rpm in a constant-temperature vessel that was temperature-adjusted to 30° C. For a beginning time period after the addition of MTMS, MTMS was dispersed in an oil drop state in the aqueous solution, and after about 3 hours, a homogeneous solution of completely dissolved MTMS was formed. This solution was used as a seed-particles-forming solution.

(2) Formation of Seed Particles

The temperature of the constant-temperature vessel was decreased to 10° C., the stirring rate was decreased to 30 rpm, and 5.0 ml of 1 mol/liter aqueous ammonia was at once added to the seed-particles-forming solution prepared in the above (1). In 15 minutes after the addition of the aqueous ammonia, polymethylsilsesquioxane particles were formed, and the solution came to be opaque.

Sixty minutes and 70 minutes after the addition, 0.2 ml of the seed particle solution was sampled each time, 2 ml of a 0.1 mass % polyvinyl alcohol aqueous solution was added, and immediately thereafter, 50,000 particles were measured for a particle diameter by the Coalter method each time in the same manner as in (2) of Example 6. As a result, both of the seed particle solutions had an average particle diameter of 8.20 µm (CV value 2.05%), and it was confirmed that the growth of the particles ended. However, it was smaller than an intended final particle diameter of 11.00 μm by 2.80 μm.

(3) Preparation of Particles-diameter-growing Aqueous Solution

A separable flask having a stirrer and a volume of 10,000 ml was charged with 5,000 g of ion-exchanged water and 500 g of MTMS, and the mixture was stirred at 100 rpm in a constant-temperature vessel that was temperature-adjusted to 30° C. For a beginning time period after the addition of MTMS, MTMS was dispersed in an oil drop state in the aqueous solution, and after about 3 hours, a homogeneous solution of completely dissolved MTMS was formed. Then, the constant-temperature vessel was adjusted to 10° C., and the above solution of dissolved MTMS was stirred until the temperature of the solution came to be 10° C. This solution was used as a particle-diameter-growing aqueous solution.

(4) Growth to Intended Particle Diameter and Subsequent Termination of Reaction

One half of the solution of the polymethylsilsesquioxane seed particles whose diameter did not reach the intended final particle diameter in the above (2) was carefully recharged into a separable flask having a stirrer and having a volume of 10,000 ml, and the solution was stirred at 30 rpm in a constant-temperature vessel that was temperature-adjusted to 10° C. The particle-diameter-growing aqueous solution in the above (3) was dropwise added with a metering pump at a rate of 25 ml/minute (0.009 ml/minute per milliliter of volume of the seed particle solution), to initiate mixing.

Particles were observed for particle growth by the Coalter method at intervals of 5 minutes under the same conditions as in above (2) until the particles grew in particle diameter by 2.80 μm. At a stage when 4,800 ml of the particle-diameter-growing aqueous solution was added after the initiation of the addition, it was found that the intended polymethylsilsesquioxane particles having a diameter of 11.00 μm (CV value 1.99%) were obtained.

Immediately thereafter, the addition of the particle-diameter-growing aqueous solution was terminated, a mixture solution containing 15 g of 25 mass % aqueous ammonia and 35 g of ion-exchanged water was dropwise added with a metering pump, and the particles were aged at room temperature for 16 hours.

(5) Classification of Fine Particles and Drying

The polymethylsilsesquioxane-particles-containing solution obtained in (4) was centrifugally separated to separate the particles, and then the procedures of irradiation with ultrasonic wave in methanol and subsequent decantation were repeated a plurality of times, to remove fine particles. The remaining polymethylsilsesquioxane particles were air-dried and then heated to 150° C. to dry them for removing residual methanol.

The thus-obtained polymethylsilsesquioxane particles were measured for a particle diameter by the Coalter method in the same manner as in (2), to show an average particle diameter of 11.00 μm (CV value 1.81%).

COMPARATIVE EXAMPLE 7

The same procedures as those described in (1) Preparation of seed-particles-forming solution and (2) Formation of seed particles in Example 7 were carried out.

As a result, polyorganosiloxane particles having an average particle diameter of 8.20 μm (CV value 2.05%) were obtained, while their particle diameter was smaller than an intended final particle diameter of 11.00 μm by 2.80 μm.

It is seen from Example 7 that in the present invention polyorganosiloxane particles having a large particle diameter of over 10 μm can be produced. Further, when Example 7 and Comparative Example 7 are compared, it can be seen that in the present invention polyorganosiloxane particles having a monodisperse particle diameter distribution can be produced while adjusting their particle diameter in the order of nm.

EXAMPLE 8

Production of Polyorganosiloxane Particles According to the Second Embodiment

The other half of the solution of the polymethylsilsesquioxane seed particles whose diameter did not reach the intended final particle diameter, obtained in (2) of the above Example 7 was carefully recharged into a separable flask having a stirrer and having a volume of 10,000 ml, and the solution was stirred at 30 rpm in a constant-temperature vessel that was temperature-adjusted to 10° C. To this solution was dropwise added the particle-diameter-growing aqueous solution prepared in (3) of the-above Example 7 with a metering pump at a rate of 50 ml/minute (0.018 ml/minute per milliliter of volume of the seed particle solution), to initiate mixing.

Particles were observed for particle growth by the Coalter method at intervals of 5 minutes under the same conditions as in (2) of Example 7 until the particles grew in particle diameter by 2.80 μm. At a stage when 4,800 ml of the particle-diameter-growing aqueous solution was added after the initiation of the addition, it was found that the intended polymethylsilsesquioxane particles having a diameter of 11.00 μm (CV value 1.88%) were obtained.

Immediately thereafter, the addition of the particle-diameter-growing aqueous solution was terminated, a mixture solution containing 15 g of 25 mass % aqueous ammonia and 35 g of ion-exchanged water was dropwise added with a metering pump, and the particles were aged at room temperature for 16 hours. The obtained particles were observed through an optical microscope, to show that foamed particles were generated.

It is seen from Example 8 that in the present invention polyorganosiloxane particles having a large particle diameter of over 10 μm can be produced. Further, when Example 8 and Comparative Example 7 are compared, it can be seen that in the present invention polyorganosiloxane particles having a monodisperse particle diameter distribution can be produced while adjusting their particle diameter in the order of nm.

Further, it is seen from a comparison of Examples 7 and 8 that when polyorganosiloxane particles having a large particle diameter are produced, foamed particles are generated if the addition rate of the particle-diameter-growing aqueous solution exceeds 0.01 ml/minute per milliliter of volume of the solution to which the particle-diameter-growing aqueous solution is added.

EXAMPLE 9

Production of Silica Particles

The polymethylsilsesquioxane particles having an average particle diameter of 3.00 μm, obtained in Example 6, were dried, temperature-increased from room temperature to 340° C. under a conditions of air flow rate of 1 liter/minute, maintained at this temperature for 12 hours to carry out preliminary calcining, temperature-increased to 540° C., maintained at this temperature for 12 hours to carry out regular calcining, whereby silica particles were obtained. After the regular calcining, the calcined particles were cooled to room temperature and taken out. The calcined particles were observed by the Coalter method to show an average particle diameter of 2.50 μm and a CV value of 2.10%.

EXAMPLE 10

Production of Polyorganosiloxane Particles According to the Third Embodiment (1) Preparation of Seed-particles-forming Solution To 5,000 g of ion-exchanged water was added 500 g of methyltrimethoxysilane (MTMS), and the mixture was stirred at 100 rpm at 20° C. After about 3 hours, a homogeneous solution of completely dissolved MTMS was formed, and this solution was used as a seed-particles-forming solution.

As will be described later, this Example used a particles-containing solution for addition was used together with the seed-particles-forming solution. The particles-containing solution for addition was prepared as follows.

To 450 g of ion-exchanged water was added 45 g of MTMS, and the mixture was stirred at 100 rpm at 30° C. For a beginning time period after the addition of MTMS, MTMS was dispersed in an oil drop state in the aqueous solution, and after about 3 hours, a homogeneous solution of completely dissolved MTMS was formed. The stirring rate was decreased to 30 rpm, and 0.72 ml of 1 mol/liter aqueous ammonia was added at once. Fifteen minutes after the addition of the aqueous ammonia, particles grew and the solution came to be opaque. After 30 minutes, the particles were measured for a particle diameter with an optical microscope video micrometer (Video micrometer "VM-50", supplied by Olympus Optical Co., Ltd.) to show an average particle diameter of 4.2 μm.

(2) Formation of Seed Particles

While the seed-particles-forming solution prepared in the above (1) was stirred at a decreased stirring rate of 30 rpm, 50 ml of 1 mol/liter aqueous ammonia and the entire amount of the particles-containing solution for addition, obtained in the above (1), were added thereto to obtain a seed-particles-containing solution. To a 0.1 mass % polyvinyl alcohol aqueous solution was added 0.2 ml of the seed particle solution obtained 30 minutes after the addition, and immediately thereafter, particles were measured for a particle diameter with a Coalter counter. As a result, particles grown from the particles for addition had an average particle diameter of 7.380 μm (CV value 1.99%), and newly formed particles had an average particle diameter (R in the relational expression (II)) of 4.305 μm (CV value 2.54%).

(3) Preparation of Particles-diameter-growing Aqueous Solution

To 33,000 g of ion-exchanged water were added 4,950 g of MTMS and 16.5 g (Y in the relational expression (II)=0.0435%) of sodium dodecyl sulfate (SDS) having an HLB value of 40, and the mixture was stirred at 100 rpm at 30° C. After about 3 hours, a homogeneous solution of completely dissolved MTMS was formed, and this solution was used as a particle-diameter-growing aqueous solution. In the above case, a in the relational expression (II) can be determined by dividing a molecular weight, 67, of a hydrolysis-condensation product $CH_3SiO_{3/2}$ of MTMS with a molecular weight, 136, of MTMS, and it was 0.49. As will be described later, in this Example, a particle-diameter-adjusting solution was added after the addition of the particle-diameter-growing aqueous solution, and the particle-diameter-adjusting solution was prepared as follows.

To 33,000 g of ion-exchanged water was added 3,300 g of MTMS, and the mixture was stirred at 100 rpm at 30° C. After about 3 hours, a homogeneous solution of completely dissolved MTMS was formed, and this solution was used as a particle-diameter-adjusting solution.

(4) Growth to Intended Particle Diameter and Subsequent Termination of Reaction

While the entire amount, 37,966.5 g (A in the relational expression (II)), of the particle-diameter-growing aqueous solution obtained in the above (3) was stirred at 20 rpm, 4,144 g of the seed-particles-containing solution obtained in the above (2) was added thereto (X in the relational expression (II)=376.7 g), to grow the particles in diameter. Particles were measured for a particle diameter with an optical microscope video micrometer (Video micrometer "VM-50", supplied by Olympus Optical Co., Ltd.) at intervals of 10 minutes after the addition of the seed-particles-forming solution. One hour and one hour and 10 minutes after the addition, the particles had an average particle diameter of approximately 13 μm each time, and it was judged that the growth of the particles in diameter ended. However, it was shown that the particle diameter was slightly short of an intended particle diameter. It was therefore started to add and mix the particle-diameter-adjusting solution obtained in the above (3), and while the mixture was observed with a video micrometer, the particle diameter was adjusted such that the particles had an average particle diameter greater by 0.5 μm. At a stage when 3,800 ml of the particle-diameter-adjusting solution was added after the initiation of the addition, it was found that particles having an intended particle diameter of 13.5 μm were obtained. Thereafter, the mixture was maintained for 45 minutes, 500 g of 25 mass % aqueous ammonia was dropwise added with a metering pump, and the particles were aged at room temperature for 16 hours. The thus-obtained polymethylsilsesquioxane (PMSO) particles were measured for a particle diameter with a Coalter counter to show a plurality of particle diameter peaks each of which was isolated from every other. Of these, particles in an amount of 75% by volume were particles having an average particle diameter of 13.48 μm (CV value 1.72%). The rest contained 14% of particles having an average particle diameter of 6.0 μm and 9% of particles having an average particle diameter of 16 μm. On the other hand, fine particles having an average particle diameter of 2 μm or less were also contained, while the content thereof was less than 1%.

In the above case, the coefficient a obtained on the basis of the values of Y, a, X and R in the relational expression (II) was 38.5.

(5) Classification of Fine Particles and Drying

The obtained particles were separated from a synthesizing solution with a centrifugal separator, and then the procedures of irradiation with ultrasonic wave in methanol and subsequent decantation were repeated several times, to remove fine particles. The remaining particles were air-dried and then heated to 150° C. to dry them for removing residual methanol.

EXAMPLES 11 AND 12 AND COMPARATIVE EXAMPLES 8 AND 9

The procedures of Example 10 were repeated except that the amount of sodium dodecyl sulfate (SDS) in Preparation of particle-diameter-growing aqueous solution in (3) of Example 10 was changed as shown in Table 1. Table 1 shows the results together with the results in Example 10. It is clear from Table 1 that polyorganosiloxane particles can be more efficiently produced in Examples 10 to 12 in which α is greater than 4.0 but not more than 75 than in Comparative Example 8 in which α is less than 4.0 and Comparative Example 9 in which α is greater than 75.

TABLE 1

|  |  | Example 10 | Example 11 | Example 12 | CEx. 8 | CEx. 9 |
|---|---|---|---|---|---|---|
| SDS | Amount of addition | 16.5 g | 2.1 g | 29.9 g | 0.27 g | 35.4 g |
|  | Y | 0.0435% | 0.0055% | 0.0787% | 0.0007% | 0.0932% |
| Theoretical value of raw material used | a | 0.49 | 0.49 | 0.49 | 0.49 | 0.49 |
| Mass (g) of raw material used for synthesis of seed particles | X | 376.7 | 376.7 | 376.7 | 376.7 | 376.7 |
| Total mass (g) of solutions used in step of growing particles | A | 37966.5 | 37952.1 | 37979.9 | 37950.3 | 37985.4 |
| Particle diameter of seed particles (μm) | R | 4.305 | 4.305 | 4.305 | 4.305 | 4.305 |
| Coefficient α |  | 38.5 | 4.9 | 69.7 | 0.6 | 82.6 |
| Particle diameter of grown particles (μm) |  | 13.48 | 13.59 | 13.51 | 14.11 | 11.96 |
| CV value (%) |  | 1.72 | 1.80 | 1.77 | 2.65 | 1.96 |
| State |  | Excellent | Excellent | Excellent | *1 | *2 |

Particle diameters and CV values other than those in Comparative Example 1 are values of particles occupying 70% or more of volumes, obtained according to Coalter method.
Ex. = Example,
CEx. = Comparative Example.
*1: Aggregated (the above particle diameter and CV value are values of peak of particles occupying approximately 40% of the volume).
*2: Not grown to an intended particle diameter. When ammonia was added to terminate the reaction, gas bubbles were generated.

INDUSTRIAL UTILITY

According to the method for producing polyorganosiloxane particles, provided by the present invention, polyorganosiloxane particles having an average particle diameter, for example, greater than 10 μm and having a monodisperse particle diameter distribution can be produced, and the particles can be suitably used in the fields of spacers, standard particles, etc., for liquid crystal displays, organic electroluminescence devices, touch panels, and the like.

Further, according to the method for producing silica particles, provided by the present invention, the polyorganosiloxane particles obtained by the above method are calcined under specific conditions, whereby having a suitable particle diameter suitable as a spacer for a liquid crystal display, standard particles, etc., and having a highly monodisperse particle diameter distribution can be produced by simple procedures for a short period of time.

The invention claimed is:

1. A method for producing polyorganosiloxane particles, which comprises the step (A) of hydrolyzing and condensing a silicon compound of the general formula (I),

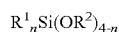

$$R^1{}_n Si(OR^2)_{4-n} \qquad (I)$$

wherein $R^1$, which is a non-hydrolyzable group, is an alkyl group having 1 to 20 carbon atoms, an alkyl group having 1 to 20 carbon atoms and having a (meth)acryloyloxy group or epoxy group, an alkenyl group having 2 to 20 carbon atoms, an aryl group having 6 to 20 carbon atoms or an aralkyl group having 7 to 20 carbon atoms, $R^2$ is an alkyl group having 1 to 6 carbon atoms and n is an integer of 1 to 3, provided that when a plurality of $R^1$s are present, each of $R^1$s may be identical to, or different from, other or every other one, and that when a plurality of $OR^2$ are present, each of $OR^2$s may be identical to, or different from, other or every other one, in the presence of a catalyst, to form seed particles of polyorganosiloxane particles and thereby obtaining a seed-particles-containing solution, and the step (B) of mixing said seed-particles-containing solution with a particle-diameter-growing aqueous solution containing a silicon compound of said general formula (I) or a hydrolyzate thereof, to grow said seed particles, the method comprising the step (A) of obtaining the seed-particles-containing solution in which, when said silicon compound is dissolved in an aqueous medium, 0.7 to 6.5 mass ppm of a basic catalyst is added to said aqueous medium to cause the silicon compound to undergo preliminary hydrolysis and condensation, and a basic catalyst is added thereto in an amount necessary for forming the seed particles formed of polyorganosiloxane, to form said seed particles.

2. The method of claim 1, wherein the basic catalyst is ammonia.

3. The method of claim 1, wherein the silicon compound of the general formula (I) is methyltrimethoxysilane or vinyltrimethoxysilane.

4. The method of claim 1, wherein the polyorganosiloxane particles produced have an average particle diameter of over 10 μm and have a particle size distribution whose coefficient of variation (CV value) is 5% or less.

5. A method for producing polyorganosiloxane particles, which comprises the step (A) of hydrolyzing and condensing a silicon compound of the general formula (I), $$R^1{}_n Si(OR^2)_{4-n} \quad (I)$$

wherein $R^1$, which is a non-hydrolyzable group, is an alkyl group having 1 to 20 carbon atoms, an alkyl group having 1 to 20 carbon atoms and having a(meth)acryloyloxy group or epoxy group, an alkenyl group having 2 to 20 carbon atoms, an aryl group having 6 to 20 carbon atoms or an aralkyl group having 7 to 20 carbon atoms, $R^2$ is an alkyl group having 1 to 6 carbon atoms and n is an integer of 1 to 3, provided that when a plurality of $R^1$s are present, each of $R^1$s may be identical to, or different from, other or every other one, and that when a plurality of $OR^2$ are present, each of $OR^2$s may be identical to, or different from, other or every other one, in the presence of a catalyst, to form seed particles of polyorganosiloxane particles and thereby obtaining a seed-particles-containing solution, and the step (B) of mixing said seed-particles-containing solution with a particle-diameter-growing aqueous solution containing a silicon compound of said general formula (I) or a hydrolyzate thereof, to grow said seed particles, the method comprising the step (B) of growing the seed particles, in which an anionic surfactant is added to the seed-particles-containing solution to grow the seed particles, the anionic surfactant having a concentration that satisfies the relational expression (II), $$Y = \alpha \times (a \times X)/(A \times R) \quad (II)$$

wherein a is a theoretical value obtained by dividing a molecular weight of a product that is a hydrolysis and condensation product of the silicon compound with a molecular weight of the silicon compound, Y is a concentration (mass %) of the anionic surfactant in the particle-diameter-growing aqueous solution, X is a mass (g) of the raw material to be used for synthesis of the seed particles, A is a total mass (g) of the solutions for use in the step (B) of growing seed particles, R is an average particle diameter (μm) of the seed particles, and α is a coefficient in the range of $4.0 < \alpha \leqq 75$.

6. The method of claim 5, wherein the anionic surfactant has an HLB value of 15 to 40.

7. The method of claim 6, wherein the anionic surfactant is a higher alcohol sulfuric ester salt.

8. The method of claim 7, wherein the higher alcohol sulfuric ester salt is sodium dodecyl sulfate.

9. The method of claim 5, wherein, in the step (A) of forming seed particles, a separately prepared solution containing polyorganosiloxane particles is added to a reaction system containing the silicon compound, and the silicon compound is caused to undergo hydrolysis and condensation in the presence of the polyorganosiloxane particles, to form the seed particles.

10. The method of claim 5, wherein the polyorganosiloxane particles have an average particle diameter of over 10 μm.

11. A method for producing silica particles, which comprises preliminarily calcining the polyorganosiloxane particles obtained by the method recited in claim 1 at a temperature that is lower than a decomposition temperature of the organic groups contained in the polyorganosiloxane particles by 150 centigrade degrees, and then calcining the polyorganosiloxane particles at or about the decomposition temperature of the organic groups of the polyorganosiloxane particles.

* * * * *